(12) United States Patent
Knoepp et al.

(10) Patent No.: US 9,503,271 B2
(45) Date of Patent: Nov. 22, 2016

(54) SYSTEM AND METHOD FOR CUSTOM CHAT INVITATIONS

(75) Inventors: Kevin Knoepp, Seattle, WA (US); Jodi Gaffney, Fall City, WA (US); Scott Carlin, Edmonds, WA (US); John Brown, Edmonds, WA (US); Christopher A. Gunther, Bellevue, WA (US)

(73) Assignee: ORACLE OTC SUBSIDIARY LLC, Redwood Shores, CA (US)

( * ) Notice: Subject to any disclaimer, the term of this patent is extended or adjusted under 35 U.S.C. 154(b) by 1067 days.

(21) Appl. No.: 12/077,882

(22) Filed: Mar. 20, 2008

(65) Prior Publication Data

US 2009/0030981 A1 Jan. 29, 2009

Related U.S. Application Data

(60) Provisional application No. 60/918,941, filed on Mar. 20, 2007.

(51) Int. Cl.
*G06F 15/16* (2006.01)
*H04L 12/18* (2006.01)
*G06Q 10/10* (2012.01)

(52) U.S. Cl.
CPC ......... *H04L 12/1818* (2013.01); *G06Q 10/107* (2013.01)

(58) Field of Classification Search
CPC .. G06Q 30/02; G06Q 30/0207; H04L 67/02; H04L 12/581; H04L 51/04; H04L 67/22; G06F 17/30873; G06F 17/3089; G06F 17/30893; G06F 8/36

USPC .................................................. 709/204–205
See application file for complete search history.

(56) References Cited

U.S. PATENT DOCUMENTS

| | | | |
|---|---|---|---|
| 2001/0054064 A1* | 12/2001 | Kannan .................... | 709/203 |
| 2002/0056091 A1* | 5/2002 | Bala et al. ................ | 725/34 |
| 2003/0028419 A1* | 2/2003 | Monaghan ................ | 705/10 |
| 2003/0078959 A1* | 4/2003 | Yeung et al. ............. | 709/201 |
| 2004/0123244 A1* | 6/2004 | Campbell et al. ........ | 715/517 |
| 2005/0246434 A1* | 11/2005 | Bantz et al. .............. | 709/223 |
| 2007/0245249 A1* | 10/2007 | Weisberg .................. | 715/758 |

* cited by examiner

*Primary Examiner* — John Macilwinen
(74) *Attorney, Agent, or Firm* — Miles & Stockbridge P.C.

(57) ABSTRACT

A method is presented for providing a Customer hosted chat invitation to a browsing user. A service provider provides a Customer with a set of interactive invitation input objects, and the Customer creates and stores a set of customized invitation setup data from interacting with the input objects. The service provider runs custom code to generate, from the set of customized invitation setup data, an invitation program code module characterized by a set of programmatic invitation criteria. The invitation program code module is connected to a web page creating program code that resides on a web server operatively associated with the Customer site so that the browsing user's choices can be monitored and stored and, when selected invitation criteria are met by these choices, an invitation event is triggered. System claims to related subject matter are also presented.

16 Claims, 24 Drawing Sheets

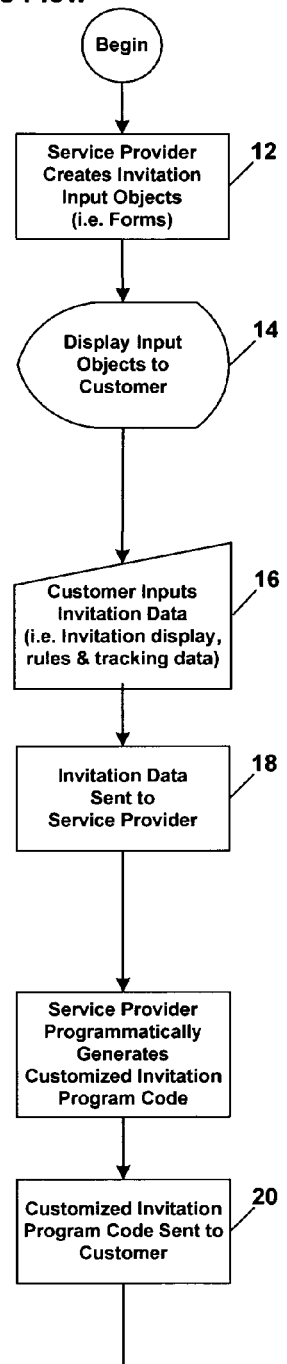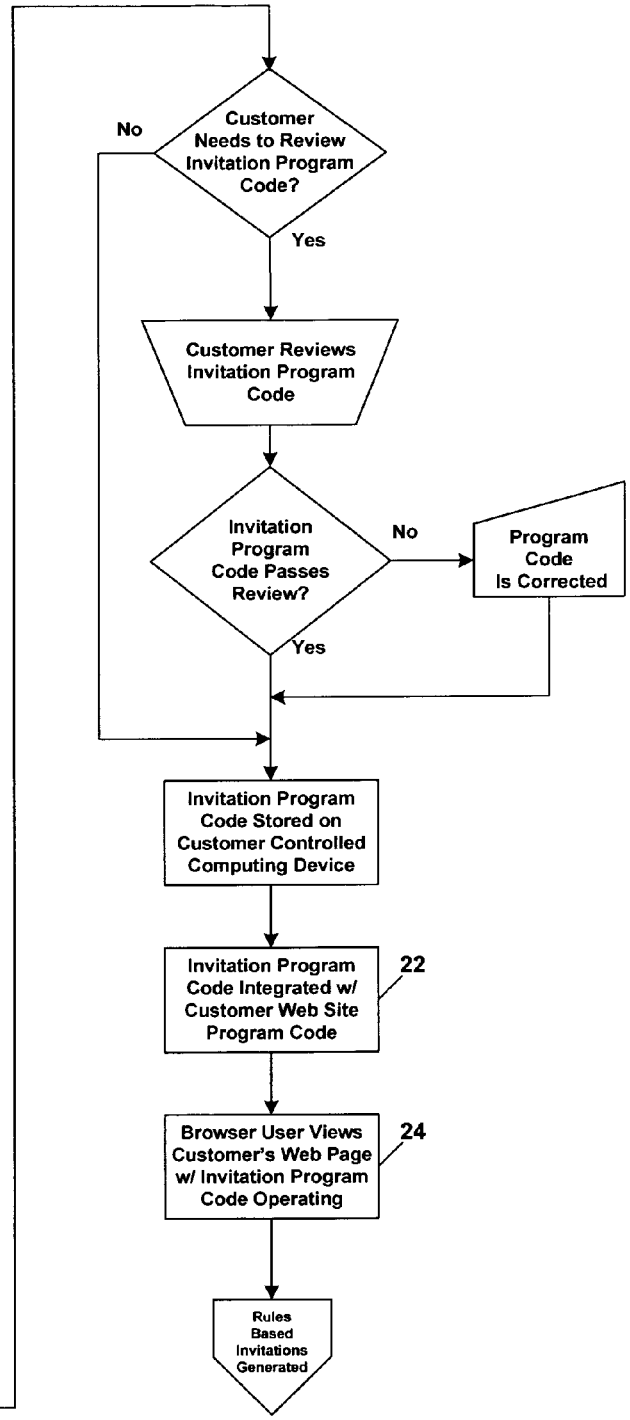
Figure 2

Customer Steps (Cont.)

Optional Features for Account: 3225 (Ruta de Maya)

Mail Features

InstantService Mail: ◯ Disabled  ⦿ Enabled
Mail Auto-Reply: ◯ Disabled  ⦿ Enabled

Agent Console Features

Spell Check: ◯ Disabled  ⦿ Enabled
Session Categorization: ◯ Disabled  ⦿ Enabled
Queue Thresholds: ◯ Disabled  ⦿ Enabled
Queue Distribution: ◯ Disabled  ⦿ Enabled
Integration Panels: ◯ Disabled  ⦿ Enabled

Customer Client Features

Customer Client Branding: ◯ Disabled  ⦿ Enabled

Website Integration

Smart Button: ◯ Disabled  ⦿ Enabled
InstantInvite 1 (legacy): ⦿ Disabled  Enabled (InstantService Hosted)
                                       Enabled (Customer Hosted)
InstantInvite 2 (legacy): ◯ Disabled  Enabled (InstantService Hosted)
                                       Enabled (Customer Hosted)
InstantInvite 3: ◯ Disabled  ⦿ Enabled (InstantService Hosted)
                              ◯ Enabled (Customer Hosted)
Tracking: ◯ Disabled  ⦿ Enabled

External API

Dashboard API: ⦿ Disabled  ◯ Enabled
Customer API: ⦿ Disabled  ◯ Enabled
Agent Availability API: ◯ Disabled  ⦿ Enabled

[ Save ]  [ Cancel ]

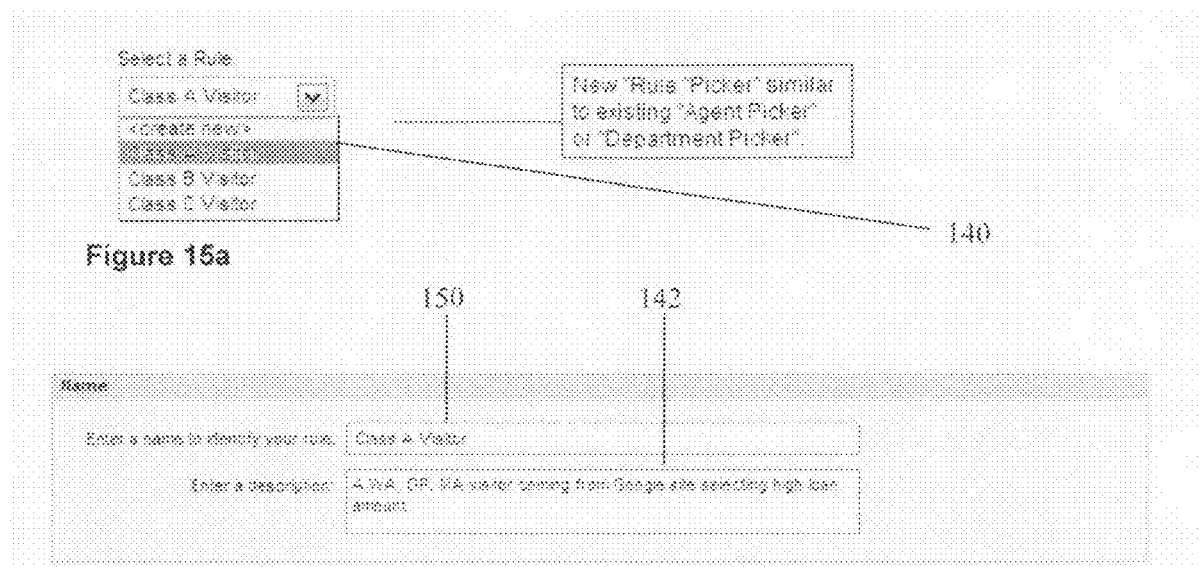
Figure 15a
Figure 15b
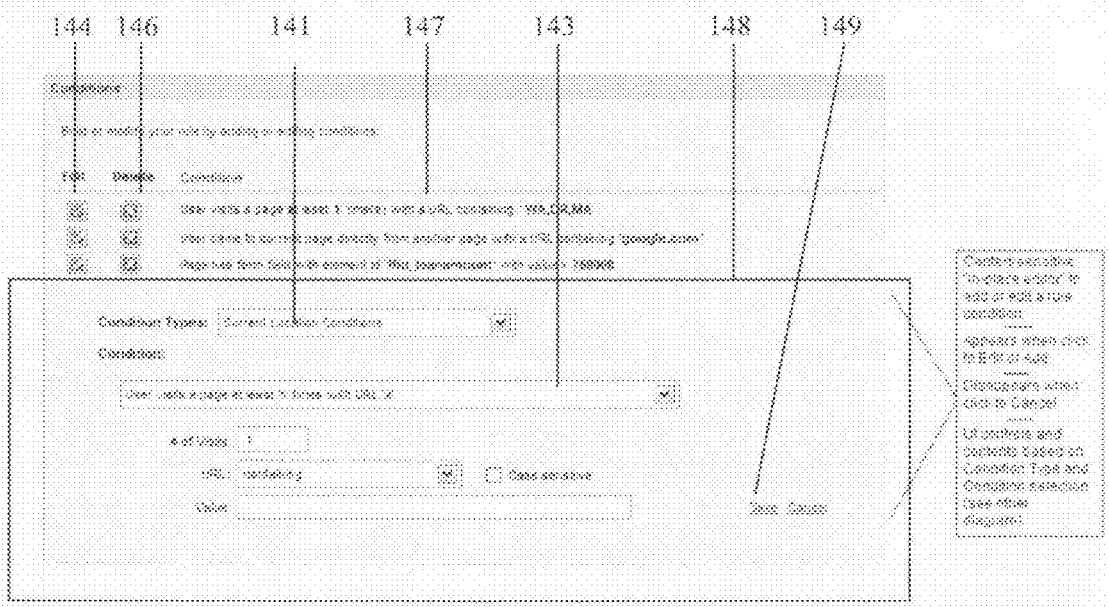
Figure 15c

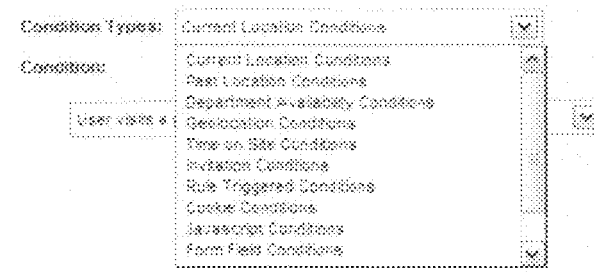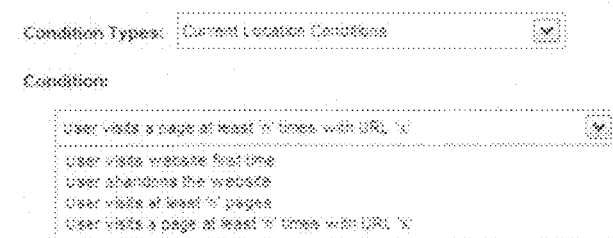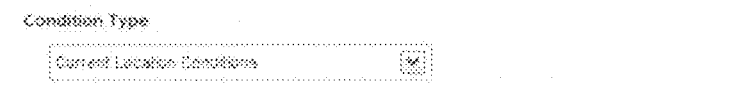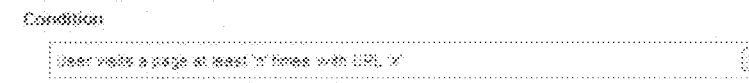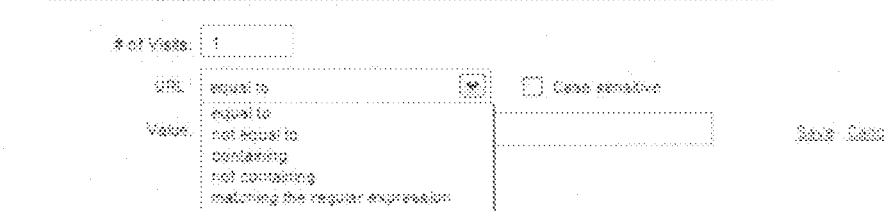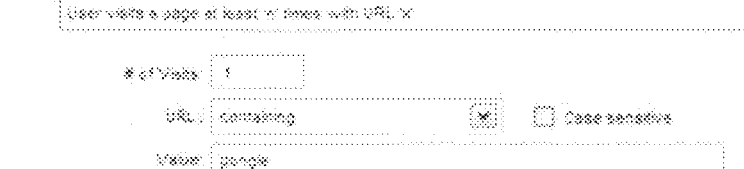
Figure 17

SYSTEM AND METHOD FOR CUSTOM CHAT INVITATIONS

This application claims priority benefit of Provisional Application Ser. No. 60/918,941 filed Mar. 20, 2007.

TECHNICAL FIELD

The invention relates to providing custom chat invitations in a distributed network environment; more particularly, it relates to system and method for generating and distributing the code for providing custom chat invitations in a distributed network environment; more particularly it relates to providing a subscription Customer with the ability to host a custom chat invitation based on programmatic invitation criteria.

BACKGROUND OF THE INVENTION

Users of distributed networks are able to communicate in "real time" (meaning almost instantaneously) through the use of programs which receive and display text input to multiple users simultaneously. These displays are known as "chat rooms" or "chat sessions" or just "chats". Chat sessions have been used extensively to facilitate customer service, live sales assistance, collaborative research and online interactive training between users of distributed networks, such as the Internet. A chat session interaction is a natural extension of browsing a web site, and companies, organizations and institutions who host web sites can obtain many benefits by providing chat sessions to customers, potential buyers, researchers and students. A chat session interaction is particularly beneficial if it can be combined with the ability to direct one or more web browsers during the chat session event.

However, adding chat session administration, browser control and other enhancements is a quantum leap from the much simpler work of web site administration. In addition, web site owners have no way of reaching out to customers, potential buyers, researchers and students to invite them to enter a chat session, except to incorporate invitational material for permanent display on the web site. Such permanent invitations can be easily ignored or missed.

Web site owners need a way to add enhancements to how they manage their relationship with users browsing their web site, such as chat session administration, browser control and other enhancements, without the quantum leap in administration, programming and hardware required. For this purpose, Internet relationship management enhancement service providers, herein referred to as service providers, offer to provide Internet relationship management enhancements to a web site owner through their own web interactive administration, programming and hardware systems. A web page owner desiring to make relationship management enhancements available to users who are browsing through the owner's web pages, becomes a customer subscriber to the service provider, and provides approved hyperlinks on the web site pages to the service provider's various services after a sign up process that sets up the web page owners preferences. The service provider then maintains all the web servers and applications necessary to provide relationship management enhancements, such as chat services and a variety of CRM, communications, marketing, sales, support, and education services, to the owner's web site, and an owner does not have to, and generally cannot, maintain and modify program code or hardware locally (beyond that needed for interaction with their own web server).

DISCLOSURE OF THE INVENTION

When the enhancements under consideration are chat session events, the additional problem exists that web site owners need a way of reaching out to customers, potential buyers, researchers and students to invite them to enter a chat session, beyond incorporating invitational material for permanent display on the web site. Disclosed herein is an effective method for invitations to be generated, hosted and displayed by a relationship management enhancements Customer to a user browsing a web site. Invitations are created dynamically, based upon how the user browses the web site. A user can be tracked as he or she navigates the website, and rules can be set up that will detect when certain conditions have been met. A condition can be a user resting on a page for a certain period of time, or something more sophisticated such as detecting when a user goes to one particular page, but does not directly go to another immediately after. To dynamically display an invitation to enter a chat session, or chat, to a user while they are browsing a site is what is referred to herein as a "rule based invitation" or an "invitation event". Disclosed herein is a system and method for the generation of rule based invitations as part of the Internet relationship management enhancement services offered to their customers by a service provider.

Furthermore, a system and method are disclosed whereby a web site owner may customize the invitation event. Within this system and these methods, a web site owner is presented with input controls, such as drop down list boxes and text boxes, for sending the service provider their selections for attributes and methods of invitation display, the rules and conditions used to trigger an invitation event, and selections to set up various tracking of invitation events and the events resulting from invitation events and the tracking reports that will be returned to them. The selections are sent to the service provider who then generates the code necessary to create customized invitations according to the customized rules.

It is possible that the invitation event generating code then resides on the service provider web servers and the web site owner incorporates into their web pages code that will call this programming as users browse their web sites. This is one method herein disclosed. However, this design has ramifications in the current security conscious distributed network environment. Some service provider customers do not want to have to access program code stored on the service provider web servers from their web site. Some web site owners see this as a security risk because they do not have control over the contents of the program code being accessed by their web pages, or as a scalability issue with the risk that timely and sensitive commercial Internet operations could bog down in the event of problems on the service provider side. Therefore, a system and method is herein disclosed for a service provider to provide its Customers with customized rule based invitations (Customer hosted) as part of its Internet relationship management enhancement services without the web page owner being required to access program code over which the web page owner has no control.

An entity which is a provider of Internet relationship enhancement services to web page owners is herein called a "service provider". Enhancement services is herein used to describe services which provide web site owners a way to add enhancements to how they manage their relationship with users browsing their web site, such as chat session administration, browser control and other enhancements. The service providers offer these enhancements through subscription to their services which are provided through the service provider's web interactive administration, programming and hardware systems. This provides the enhancements to the owner's web site without the owner investing in the administration, programming and hardware systems required for the enhancements.

Any company, organization, institution, government agency or other entity which owns and operates a web site and subscribes to the services offered by the service provider are referred to herein as "Customers". In related documents, the term "client" may be used for subscribing Customers. Herein, we are using the term "Customer" for this entity to avoid confusion with the term client as part of a client/server architecture. Also, in related documents, the term "user" may be used for subscribing Customers. Herein we are using the term "Customer" for this entity to avoid confusion with users of browsers or applications in any other capacity associated with the disclosed system and methods.

Persons browsing the Customer's web sites are referred to herein as "End Users". An End User may be a customer, potential buyer, researcher, educator, student, or any other person obtaining information from or considering making purchases from a web site. In the case of providing chat session invitations, these persons would be the user requesting a chat session. In some related documents, the End Users are also referred to as "customers". In this regard, they are the customers of the Customer. To avoid confusion, in this document we are using the term End Users for these persons.

Persons performing in an enhancement capacity for the Customer's web sites are referred to herein as "Agents". An Agent may be a customer service agent, sales agent, tutor or other employee or associate of a Customer. In the case of providing chat session invitations, these persons would be the person to whom an End User is connected (in a chat session or other enhancement environment) once they have responded affirmatively to a rule based invitation.

The system and method of the present invention are advantageously suited for use over a public network such as the Internet due to its widespread availability. When used in conjunction with "network", the term "public" is intended to imply that the user's access to the network is not controlled by or limited to a particular business entity or group of business entities. Likewise, the term "distributed" implies that processing capabilities and services are advantageously spread out among different nodes of the network with different nodes providing different services, as opposed to being centralized within a single host, server or LAN. In general, however, the system and method can be used on any type of distributed network over which online services are provided by web site owners to browsing users, including both public and private, and hybrid public-private networks.

As used in this document, the terms "site" and "web site" are both used to connote a node on a distributed network. A site may be serviced by more than one physical (web-type) server running web serving applications. Indeed, a site might be located in more than one physical location. Usually sites are made up of more than one web page, but not necessarily so. For the purposes of this application a site is the entirety of the cohesive presence of a Customer of a service provider (service provider as defined above) on a distributed network, such as the Internet.

A "web page" is a discreet document or file served to a browsing user for display and interaction over a distributed network, the document sometimes accompanied by interactive scripting languages such as JavaScript, ASP, JSP or the like. The web pages referenced in this document are generally dynamic pages with content that can change each time they are accessed. The scripts embedded in or accessed by the web page generally run functions on the serving web server or the receiving computing device and are capable of returning data.

An input object as defined in this document is an interactive control embedded in the programming of a web page, capable of returning data from a user of a computing device who is viewing and physically interacting with the computed display of a web page or application. Examples of input objects are radio buttons, check boxes, drop down list boxes, text boxes that receive string data, date pickers, and the many that are familiar to those skilled in the art. This list is of course illustrative and not intended to be exclusive.

A novel system and method are disclosed for Customers to host their own invitations to users browsing the Internet to engage in chat sessions with Customer agents for the web pages being browsed. More particularly, it discloses system and method for a web page owner to control, customize and host chat invitations, and to host a custom invitation program code module as well, which presents the chat invitation without the Customer having to generate the code module. Thus Customer administrators can have generated by a service provider a module that includes the code necessary to implement such invitation rules as they choose to define. The generated code module is hosted on Customer web servers.

A method is disclosed for providing a Customer hosted chat invitation to a browsing user to have a chat on a Customer site on a distributed network. A browsing user may be anyone who navigates to, is directed to, or happens upon, a web page owner's web page. In some cases alternate terminology, "first browsing user," "second browsing user," or the like, is intended to encompass different scenarios that arise from one browsing user to the next, as well as to encompass Customer/browsing user interaction preferences from one web page owner to the next, or of one web page owner for one of his/her web pages to the next. In this disclosure, it is intended that invitation events may be customized from one web page owner to the next, from one web page to the next, and in anticipation of differences between one browser, or class of browser, to the next.

Thus a particular Customer can create invitations that are particular to particular user browsers, or kinds of browsers, or to whole putative or selective or created classes of user browsers, or that are particular to selected web pages, or particular to selected content of particular pages. Desirably, and upon the programmatic determination that a browsing user meets certain predetermined invitation criteria, the browsing user is invited to a real time chat with someone operatively associated with the Customer's web site, such as a sales agent, or a technical support agent, or the like. The predetermined invitation criteria are selectably and interactively derived by Customer interactions with a set of input objects, which objects optionally include rules input objects, display input objects, and tracking input objects, combinations thereof, as well as many other input objects familiar to those skilled in the art.

In the disclosed method, a service provider provides to the Customer a set of interactive invitation input objects, with which the Customer interacts to create, collect and store in memory such data as will be used to generate programmatic rules, programmatic display conditions, and optional programmatic tracking criteria, and the like (as further discussed herein), any of which, or any combination of which, or all of which may sometimes be referred to herein as invitation criteria. Some examples of such input objects include a drop down list box, or series of text boxes, or combo list box, selectable box or radio button, or a combination of these, and may also include any input object form, such as a javascript generated input form, either now known to those skilled in the art, or later developed, and any of which may be advantageously nested one in the other, such that one input object is dynamically displayed only upon selection by the Customer of a predetermined field or value in a hierarchically arranged set of such input objects. The Customer interacts with the input object to create and store in memory, sometimes in memory operatively associated with a Customer controlled computing device, a customized set of invitation setup data.

The particular set of setup data thus created is used to create invitation criteria for invitation events that are based on the collected and stored rules, display and tracking preferences of the Customer that have been interactively elicited during interaction with these rules input objects, display input objects, and tracking input objects. Optionally, the set of setup data may be stored, or incrementally stored, in memory on a service provider site on the distributed network. The customer may desirably also create more than one set of invitation criteria within any given set of setup data, to effect selectable and alternate invitation scenarios with the same or alternate browsing users, and for the same or alternate sets of web pages.

Optionally, at this point, the Customer sends the customized set of invitation setup data to a service provider server through a distributed network. Alternately, the Customer interacts with any particular input object in some other fashion, such as via a separately provided disc that runs on the Customer computer.

The service provider then runs a code generation program that is customized to work specifically with the set of customized invitation setup data created from a particular set of input objects (which, as indicated above, may contain data for more than one invitation setup), to generate an invitation program code module for the Customer, which likewise may contain more than one set of invitation criteria. Each invitation program code module contains invitation rules and display conditions and optionally tracking conditions for the browsing user; each invitation program code module is thus characterized by a set of programmatic invitation criteria. Optionally, the invitation program code module is sent to the Customer over the distributed network, but could alternately be delivered by disc or other known data transport means.

The invitation program code module is then stored on a computing device that is operatively associated with the Customer site, and it is interactively connected to the program code that is creating the Customer's web page. This web page creating code generally resides on a web server operatively associated with the Customer site.

In some embodiments, before connecting the program code module to the Customer web page, the Customer reviews the invitation program code module before connecting it to the web page creating program code that resides on the web server operatively associated with the Customer site, either by searching for code in the module that is in any way inoperable with the web page creating program code residing on the Customer web server, or by searching for code in the module that is deemed to present a possible or actual security compromise, or both.

In addition, the method desirably includes collecting and storing web page browsing data for the browsing user on a data storage medium, and programmatically evaluating the browsing user web page browsing data according to the selected invitation criteria of the invitation program code module, and then triggering an invitation event when the evaluated browsing user data meets the set, or a selected subset, of the invitation criteria (or rules or other programmatic conditions) of the invitation program code module.

Optionally, the method also includes storing invitation event tracking data, such as whether the invitation was accepted or declined, on a data storage medium, and reporting the invitation event tracking data to the Customer.

The method also contemplates the Customer from time to time reviewing and editing the set of customized invitation setup data to revise an invitation setup, or to add further invitations to the setup data, followed by the step of the Customer sending the revised setup data to the service provider to regenerate a new invitation program code module.

Several system embodiments for providing a Customer hosted chat invitation to a browsing user to have a chat on a Customer site on a distributed network are also presented. Program code is stored on a service provider memory storing computing device, wherein the service provider computing device has a processor for running the program code in memory, and the program code is configured to generate and send to a Customer a set of interactive input objects, and to receive from the Customer and store a set of customized invitation setup data created by the Customer from the set of interactive input objects. The service provider memory storing computing device program code is also configured to generate a chat invitation program code module from the Customer invitation setup data. The invitation program code module includes a set of programmatic invitation criteria. The service provider memory storing computing device program code is also configured to send the chat invitation program code module to a Customer memory storing computing device through a distributed network, and there is program code stored on the Customer memory storing computing device, with a Customer processor for controlling the program code in memory. The program code is configured to receive and store the chat invitation program code module. The program code stored on the Customer memory storing computing device is configured to create a distributed network page, with the network page creation program code operatively connected to the invitation program code module.

Two alternate embodiments disclose like system subject matter and are framed as client/server architectures, with a web server operatively connected to the client in one of the systems, but not in the other. A further alternate system is disclosed in terms of means for fulfilling certain disclosed functions, with the intent that any system like, or equivalent to, any embodiments disclosed herein be disclosed hereby and claimed.

BRIEF DESCRIPTION OF THE DRAWINGS

FIG. 2 is a flowchart of processes for one embodiment of the disclosed system and method.

FIG. 5 is a screen shot for Customer interaction with one embodiment of the disclosed system and method.

FIG. 15 is a screen shot for Customer interaction with one embodiment of the disclosed system and method.

FIG. 17 is a schematic illustration of a process for Customer interaction with one embodiment of the disclosed system and method.

BEST MODE OF CARRYING OUT THE INVENTION

Figure 1:
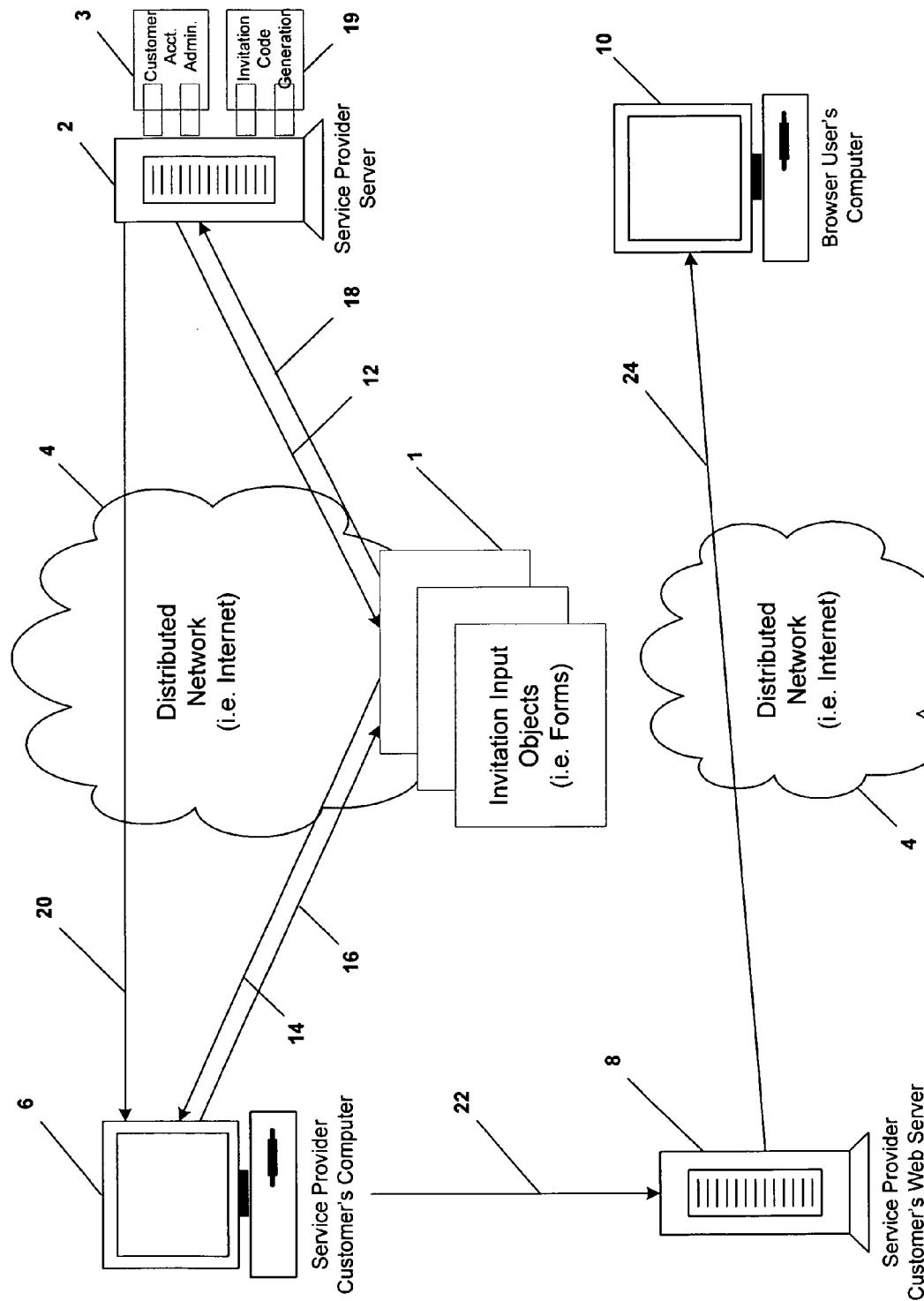
FIG. 1 is a physical component diagram of one embodiment of the disclosed system.

Turning now to the drawings, the invention will be described by reference to the numerals of the drawing figures wherein like numbers indicate like parts.

FIG. 1 is a physical component diagram of one embodiment of the overall system and FIG. 2 is a flowchart of processes for one embodiment of the overall system. Alternate physical component configurations are contemplated for embodying the system and methods disclosed, and the embodiment illustrated is not intended to be exclusive. In FIG. 1, interactive processes are illustrated as directional arrows; processes in FIGS. 1 and 2 share like numbers.

A service provider provides Internet relationship management enhancement services to a Customer, the Customer being the owner of a node upon distributed network 4, such as a web site on the Internet. The service provider is running one or more computing devices, such as a web server 2, interactively connected to one or more of the Customer's computing devices 6, through a distributed network 4.

The service provider creates interactive invitation input objects 1 (process 12), optionally arranging them on input forms. This can be done in a variety of ways, including through a program code module residing on service provider server 2, such as Customer account administration engine 3. Input objects 1 are then displayed to the Customer (process 14), who interacts with them and inputs data responsive to them (process 16) to create a set of invitation setup data. Some examples of such data are: 1) which department the invitation will refer an invitation acceptance to; 2) how the invitation will be programmatically generated; 3) how the invitation will display; 4) what conditions will be evaluated and what rules will be applied to trigger an invitation event; 5) what customized program code (such as JavaScript) will be run at various times during the invitation processes; and 6) what tracking data related to the invitation processes will be collected.

The data input, such as data selected from information custom embedded in input objects 1 by the Customer, or information input manually by the Customer, is then sent to the service provider (process 18). In a distributed network environment, and, more particularly, an Internet relationship management enhancement environment, the data may be sent in a variety of ways. For example, it could be batched and sent as part of a service account administrative program installed on the Customer's computing device 6 or on service provider's server 2 (such as Customer account administration engine 3), it could be submitted as part of web page interaction from a site maintained on service provider's web server 2, or by any other processes commonly practiced in the art.

Upon receipt of the data, the service provider programmatically generates customized invitation program code using the set of invitation setup data and sends it to the Customer (process 20). Advantageously, the service provider generates the code by running invitation code generating engine 19, which has been specifically developed for this purpose, and is adapted to work specifically with input objects 1. The resultant customized invitation program code module is then sent to the Customer (process 20).

At this point in the processing, the Customer has the opportunity to review the code which has been generated by the service provider. If any problems are found in the code, the invitation program code is corrected. Once the invitation program code module is acceptable, it is placed on a computing device over which the Customer has control, such as the Customer's web server 8, and the invitation program code is integrated with the Customer's web site (process 22). Advantageously, each web page for which an invitation may be generated is integrated with the invitation program code. The process of storing the invitation program code and integrating the invitation program code with a Customer's web site (process 22) is sometimes referred to herein as "publishing" the invitation program code.

Once the invitation program code is integrated with the Customer's web pages, as a browsing user views Customer web pages on the user's computing device 10, with the invitation program code running (process 24) and tracking the browsing user's stored profile, if any, and/or the user's current browsing activities on the Customer web pages, and evaluating conditions and applying rules, and, if triggered by the programming, generating invitations. Optionally the code is also tracking the invitation generation conditions and the results of those invitations. Upon Customer request, the tracking data collected is presented in various tracking reports.

Figure 3A:
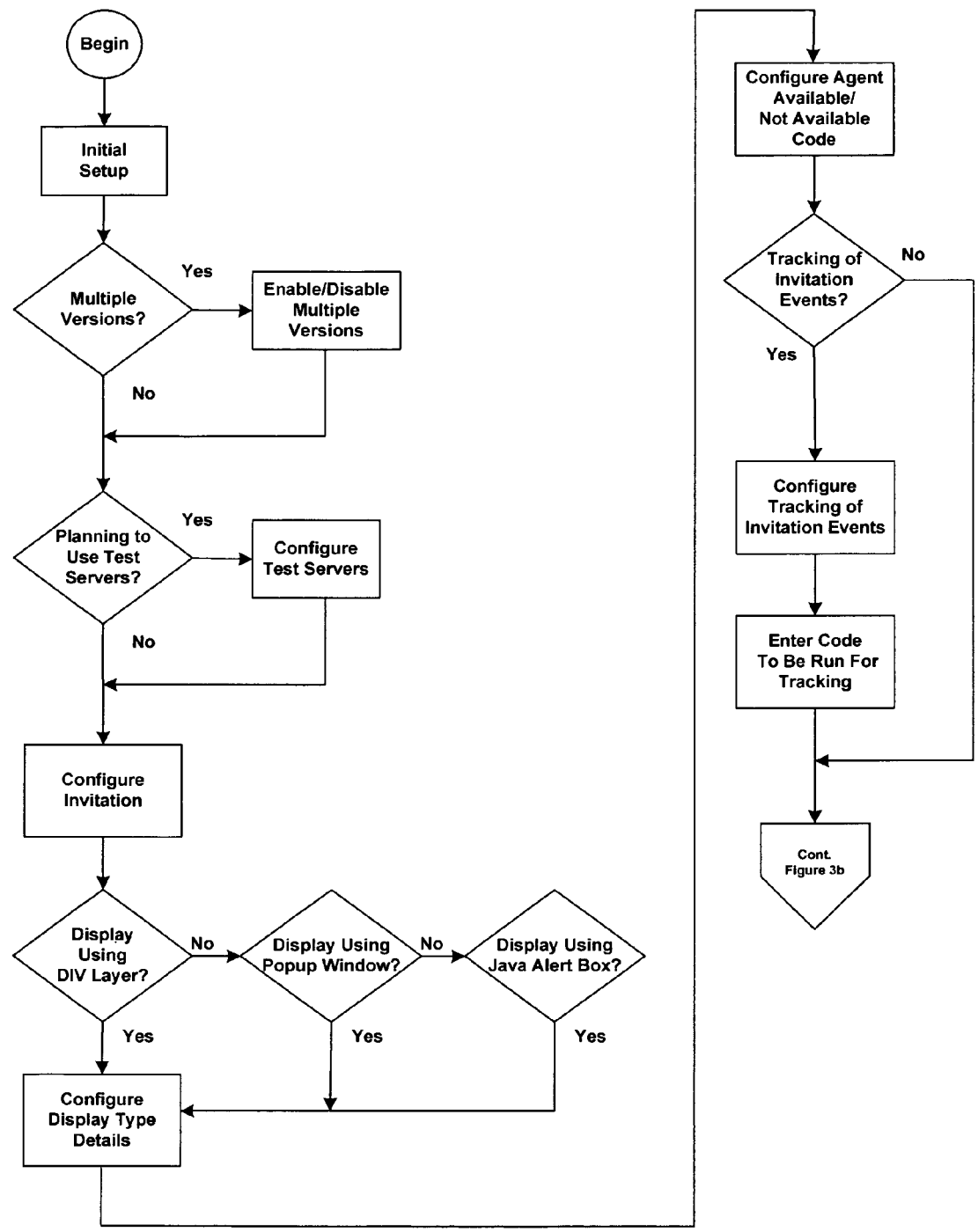
FIGS. 3a and 3b are a flowchart of Customer processes used to create, define and track invitations.
Figure 3B:
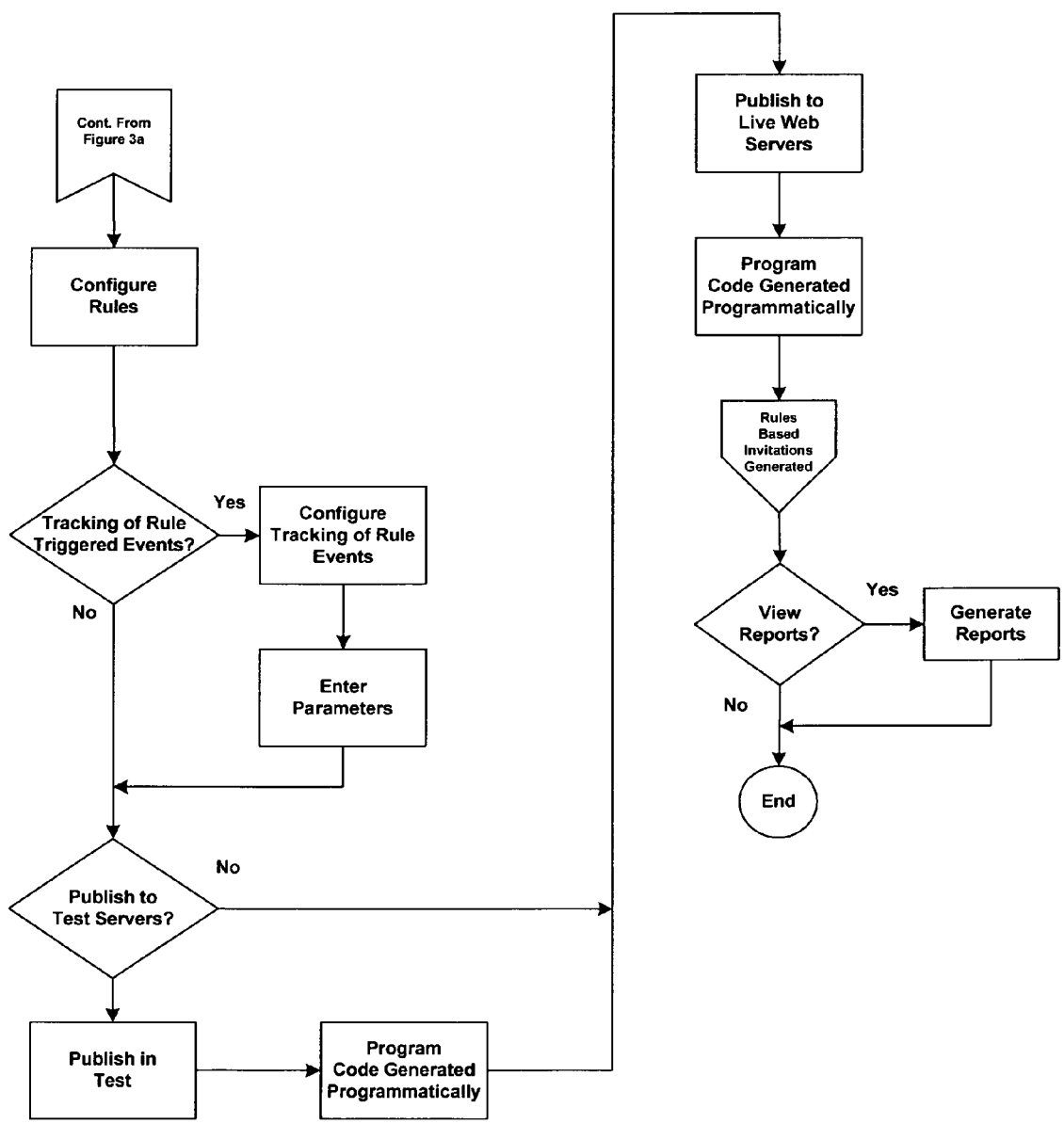

FIGS. 3a and 3b are a flowchart of Customer steps and processes used to create, define and track their Customer hosted invitations. Several embodiments will be discussed that follow this basic process flow, and individual processes and steps will be further clarified by reference to figures of screen shots created for the several embodiments. Illustrated in the figures of screen shots are examples of input objects which are used for the Customer invitation setup data referred to in FIGS. 1 and 2 as process 16.

Figure 4:
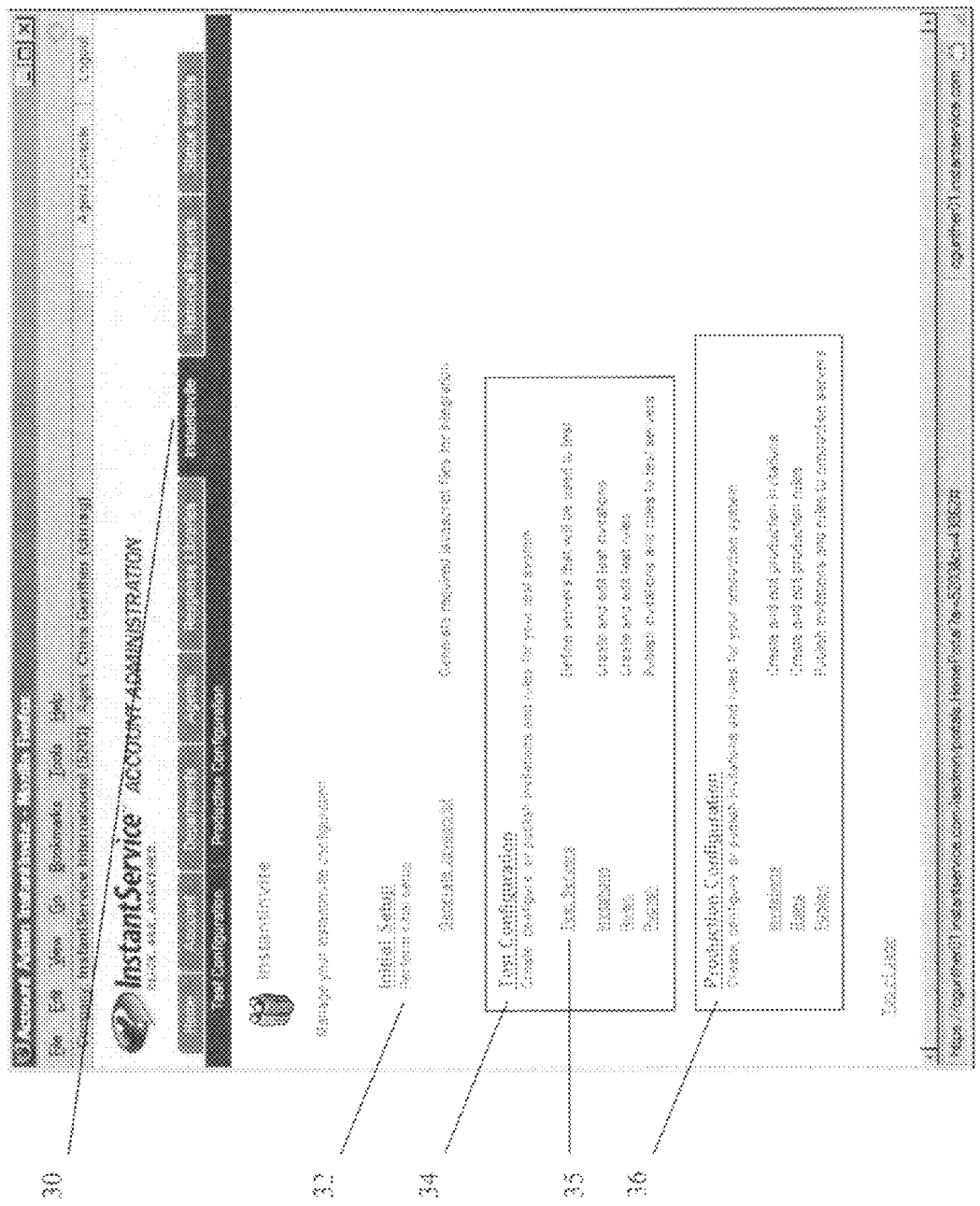
FIG. 4 is a screen shot for Customer interaction with one embodiment of the disclosed system and method.

Optimally, within an Internet relationship management enhancement environment, the rule based invitations feature is not enabled by default, but can be enabled by a service provider account manager upon request. Once the feature is enabled, a rule based invitations portal tab appears in the account administration functions of the system. An example of such a portal for beginning the invitation incorporation process is illustrated in FIG. 4 where a Customer can select the rule based invitations feature administration module by clicking tab 30.

Advantageously, an initial setup process is performed to ready the Customer to begin creating Customer hosted invitations. This is the first step in FIG. 3a. Clicking "Initial Setup" link 32 in FIG. 4 navigates the Customer to the pages that are used to set up the rule based Customer hosted invitations feature for a Customer's web site.

After an initial setup, the question arises of multiple version of the rules based invitations module. If there are multiple versions within a Customer's system, the next step in FIG. 3a is to enable and disable versions during testing and configuration. FIG. 5 illustrates the situation where multiple versions of the rules based invitations module are being tested or used by different departments within a Customer's system. It is expected that a Customer's current version of a rule based invitations module will become obsolete with subsequent releases depending upon the complexity of the enhancements. It is advantageous to allow those currently using a particular version of a rules based invitations module to continue to do so until the new rule based invitations module system has been configured and integrated successfully. Therefore, an input object 40 is advantageously made available to Customers so that they will have both the legacy option and the new rule based invitations module option available to them. Input object 40 allows customers to enable and disable legacy and new versions of the rules based invitation module. Optionally they are able to have both enabled at one time. In this embodiment, once a Customer disables the legacy option, only the new rules based invitations module option is available. Advantageously, a backdoor to re-enable the legacy option is available for testing and as a safe-guard.

The next step in FIG. 3a depends upon whether a Customer is choosing to test the rules based invitations module configurations before actually running them on their web site. In a preferred embodiment, a Customer can use test or staging servers to test changes to their system prior to releasing those changes to their live or production servers. The Customer uses this feature to test any invitation rule changes without having to make them immediately available to live web site browser users.

The choices for either configuring for a test environment or a production environment are illustrated in FIG. 4. In this embodiment, the portal displays two sections: one for configuring for testing (area 34) and one for configuring for production (area 36). This advantageously provides a clear differentiation between test and production invitations, rules and publishing, and allows the Customer to change test invitations and rules without impacting those configured for production.

Figure 6:
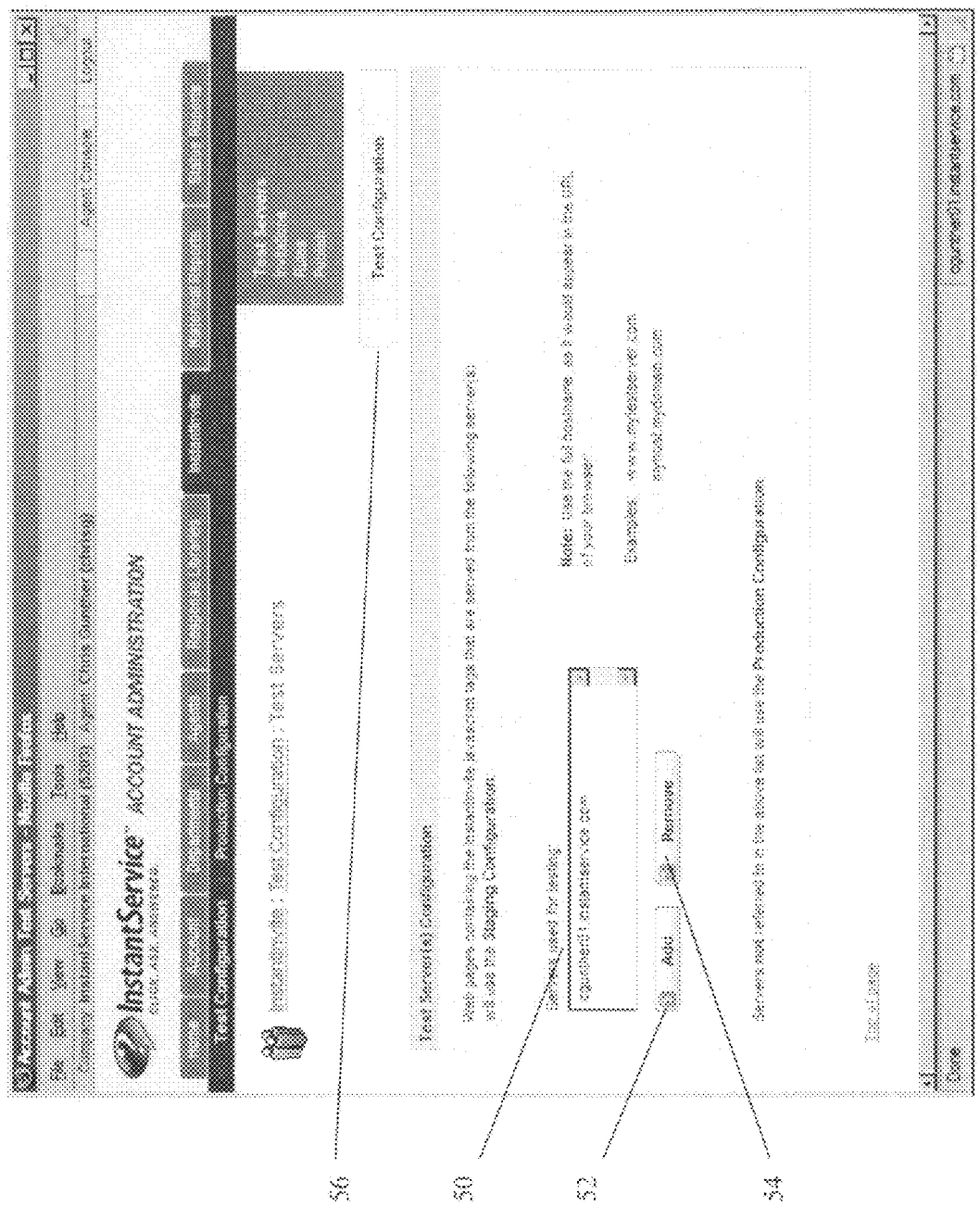
FIG. 6 is screen shot for Customer interaction with one embodiment of the disclosed system and method.

If a Customer chooses to use test servers, the next step in FIG. 3a is to configure the test servers to be used. Once the functionality to perform "Test" publishes is enabled, the Customer has the ability to define the servers that will be used for the testing of rules that have been published to the test environment. Optionally, if the test publishing functionality is not enabled, the user interface allowing them to define test servers will be disabled. In the portal illustrated in FIG. 4, the Customer clicks upon link 35 to navigate to the test server configuration page which is illustrated in FIG. 6. On the test server configuration page illustrated, the Customer adds multiple servers to the list of servers that are used for testing by clicking add button 52. After adding a server address to a text box input object, the new server is then displayed in list box 50. A Customer removes test servers from the configuration by selecting the server address in list box 50 and clicking remove button 54. Once a test server is added to the list web pages served from that server use test published rules instead of live published rules. Optionally, a Customer leaves the test server list box 50 empty when they don't want to actively use any test servers to test invitation rules. It is preferable that in order to reduce the possibility of a Customer mistakenly editing the wrong configuration, the pages within each sub-portal (test and production) have an obvious visual indicator, such as label 56, to identify which configuration is being edited.

The next step illustrated in FIG. 3a is to configure an invitation. An invitation is generally an offer made to a browsing user of a Customer's web site. Optionally, an invitation is web HTML content dynamically displayed to a browsing user as he or she navigates through a web site. Typically an invitation includes an image graphic with text asking the user if they would like to chat, as well as accept and decline buttons. It can be something as simple as an image the user clicks to initiate a chat with an agent, or something more sophisticated such as a form the customer completes before requesting a chat. Invitations need not necessarily direct a Customer to a chat session; for example, an invitation may ask a browsing user if they want a printable coupon for the item they are viewing, with the acceptance of the offer resulting in the running of custom program code that delivers a web page with the printable coupon.

Figure 7:
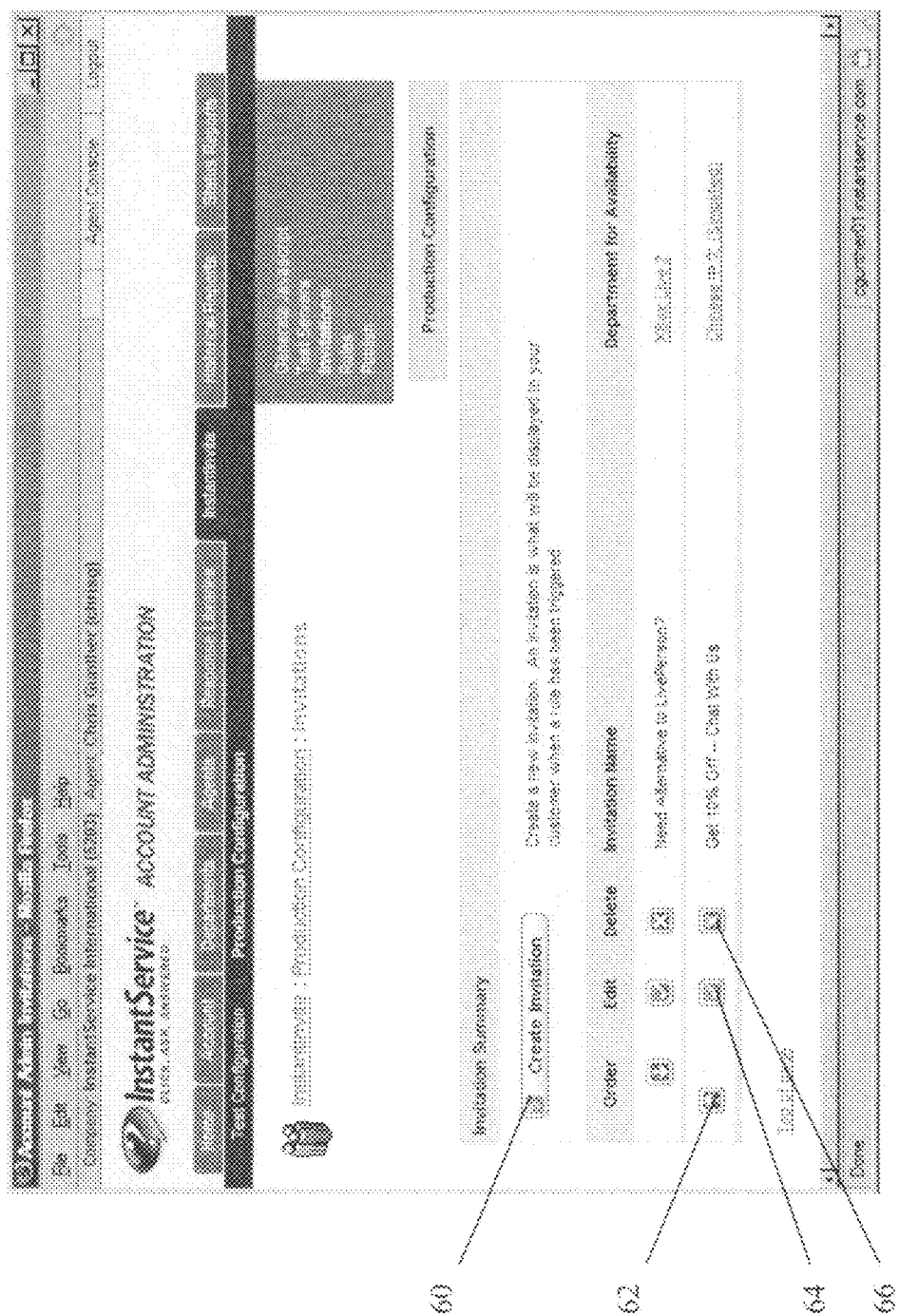
FIG. 7 is a screen shot for Customer interaction with one embodiment of the disclosed system and method.

In FIG. 4, a Customer chooses to configure an invitation by clicking on either the invitations link under the test configuration link (in area 34) or production configuration link (in area 36) for configuring invitations in the test and production servers respectively. The invitations link will navigate the Customer to an input page, for example like the one illustrated in FIG. 7. This page provides a Customer with the ability to create new invitations by clicking on input button 60, reordering the invitations on the page for better presentation by using the order buttons 62, edit an invitation already created by clicking edit button 64 or deleting existing invitations by clicking delete button 66.

Figure 8:
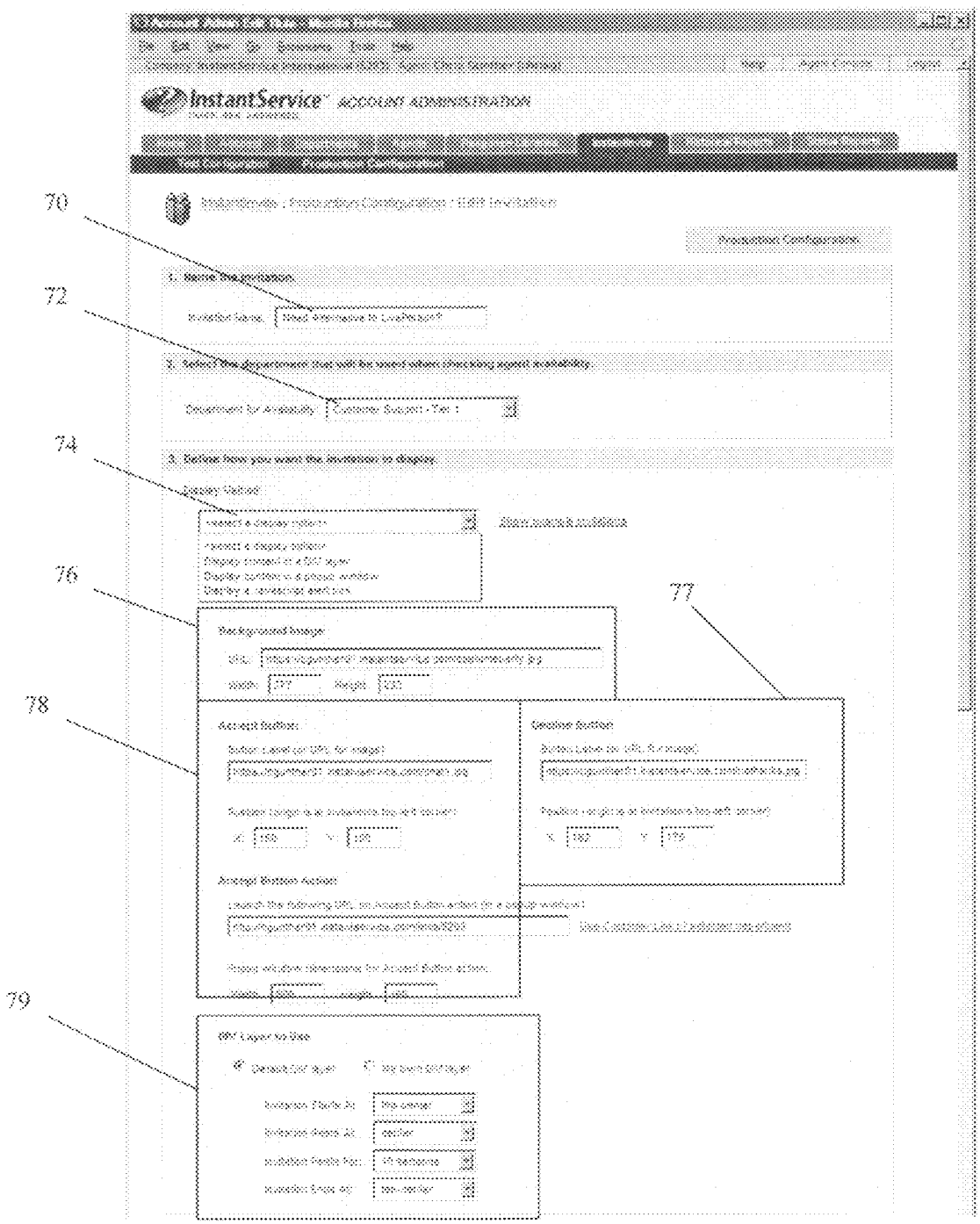
FIG. 8 is a screen shot for Customer interaction with one embodiment of the disclosed system and method.

FIG. 8 illustrates one embodiment of a create invitation or edit invitation input page for use when a Customer is creating or editing an invitation. Input to define an invitation's content is divided up into several steps with each step and it's purpose described below. Customers make selections and enter text data using input objects as indicated.

The first step is to name the invitation by entering the text into text box 70. Each invitation is given a name that describes the invitation so that it can be easily found on the invitations page illustrated in FIG. 7.

The second step is to select a department that is used when checking agent availability by selecting one from drop down list box 72. An invitation is associated with a department that will be checked for agent availability. An invitation is associated with a particular Customer department. When a user accepts an invitation, a chat window appears and the customer enters the department defined by the invitation. Advantageously, multiple invitations are defined for each department.

When a rule is defined, the rule is associated with an invitation along with an option to check to see if agents are available before offering an invitation. If the rule definition states that the availability check is to be made, it uses the department associated with the invitation to do the check.

The third step is to define how the invitation will be displayed. This section will allow the Customer to direct all aspects of the invitation without entering any programming code, such as HTML or JavaScript. The following aspects of the invitation are configurable:
1) How to display the invitation: DIV layer, popup window or JavaScript alert box, or the like, now known or later developed,
2) Background image of the invitation, as well as the image width and height,
3) The label or image to use for the accept and decline buttons,
4) The positioning of the accept and decline buttons,
5) The URL to launch when the invitation is accepted, and
6) Details of the DIV layer animation and placement (if DIV layer option is chosen).

As explained above, in this embodiment, there are three distinct ways of showing an invitation, each described in detail below. Invitations are displayed to a browsing user by any of several methods. An invitation is shown as an animated layer that "floats" into the web page, as a popup window, or as a JavaScript alert message. Another option is for an invitation to be shown in a predefined layer that a Customer has already created on a Customer's web page.

In FIG. 8 are illustrated the input objects used (in this embodiment) for the first method of showing an invitation, to display content in a DIV layer. It is advantageous that when a Customer selects the DIV layer option from list box 74, these input objects are dynamically displayed, meaning they appear when the DIV layer option is selected and disappear when the DIV layer option is deselected. The DIV layer option provides a Customer with the ability to use either an animated invitation defined and managed by the service provider, or a custom DIV layer that has already been defined on the Customer's web page. When using the DIV layer option, the following information is filled in:
1) Background Image URL: A Customer enters data for the creation of the background image on the invitation by using the input objects in area 76. A Customer types the full URL to an image into a text box in area 76. The URL points to an image file that a Customer would like to use as the background for a Customer's invitation. It is advantageous to make sure that the http protocol of the Image URL matches that of the http protocol of the web page that will be displaying the invitation to avoid browser warnings. For instance, if a Customer's web page is loaded under the https protocol, the image URL should also use https.
2) Background Image Width and Height: A Customer enters data for the creation of the background image on the invitation by using the input objects in area 76. A Customer enters the width and height of a Customer's background image (in pixels) into text boxes in area 76. Advantageously, if a Customer doesn't know the dimensions, a Customer loads the image in a Customer's browser, right clicks on it, selects 'Properties', and it displays the image's width and height.
3) Accept Button Image URL (or text): A Customer enters data for the creation of the accept button on the invitation by using the input objects in area 78. A Customer types in the full URL for an image to be used for the Accept button that will appear on the invitation. As an alternative, a Customer just types in text (i.e. "Chat Now!") and an HTML button is created instead of using an image. Optimally, the Customer makes sure that the http protocol of the Image URL matches that of the http protocol of the web page that will be displaying the invitation to avoid browser warnings. For instance, if a Customer's web page is loaded under the https protocol, the image URL should also use https.
4) Accept Button Position: A Customer types into a text box the x,y coordinates in which the Accept button appears with the origin being the top-left corner of the invitation.
5) Decline Button Image URL (or text): A Customer enters data for the creation of the decline button on the invitation by using the input objects in area 77. A Customer types into a text box the full URL for an image to be used for the Decline button that will appear on the invitation. As an alternative, a Customer may also just type in text (i.e. "No, Thanks!") and an HTML button will be created instead of using an image. Optimally, the Customer makes sure that the http protocol of the Image URL matches that of the http protocol of the web page that will be displaying the invitation to avoid browser warnings. For instance, if a Customer's web page is loaded under the https protocol, the image URL should also use https.
6) Decline Button Position: A Customer types into a text box the x,y coordinates in which the Decline button will appear with the origin being the top-left corner of the invitation.
7) Accept Button Action Launch URL: A Customer types into a text box the URL that will be used to launch the a chat client. Optionally, the chat client advantageously launches in a popup window. To use the customer link for the department for which availability is being checked, a Customer clicks a Use Customer Link for Selected Department link next to the URL text box. This pre-fills in the link for the department as well as the appropriate width and height dimensions for the popup. If at a later time a Customer changes the department to check for availability, the Customer re-clicks the Use Customer Link for the Selected Department link so that the chat customer will come into the selected department rather than into the previously selected one.
8) Accept Button Action Popup Window Dimensions: A Customer types into a text box the width and height dimensions for the customer client popup window that will appear. These settings should match the dimensions appropriate for the customer client layout for the department, either classic (600×160), or expanded (500×320).
9) DIV Layer to Use: A Customer enters data for the DIV layer by using the input objects in area 79. A Customer selects whether they want the invitation to use the Default DIV layer (predefined by rule based invitations) which uses animation, or whether a Customer wants to use a custom DIV layer that has already been defined on a Customer's page. Advantageously, when using the Default DIV layer, a Customer selects where on the page they want the animation to start at, rest at, end at, as well as how long a Customer wants the invitation to appear on the screen before going away automatically.

When using the custom DIV layer, a Customer advantageously enters the DIV layer ID as defined on a Customer's page. The invitation then appears inside of this DIV layer on their page. For example, if a Customer's web page has the html tag: <DIV ID="myCustomDiv"> </DIV>, a Customer sets the DIV Layer ID field to be myCustomDiv.

Figure 9:
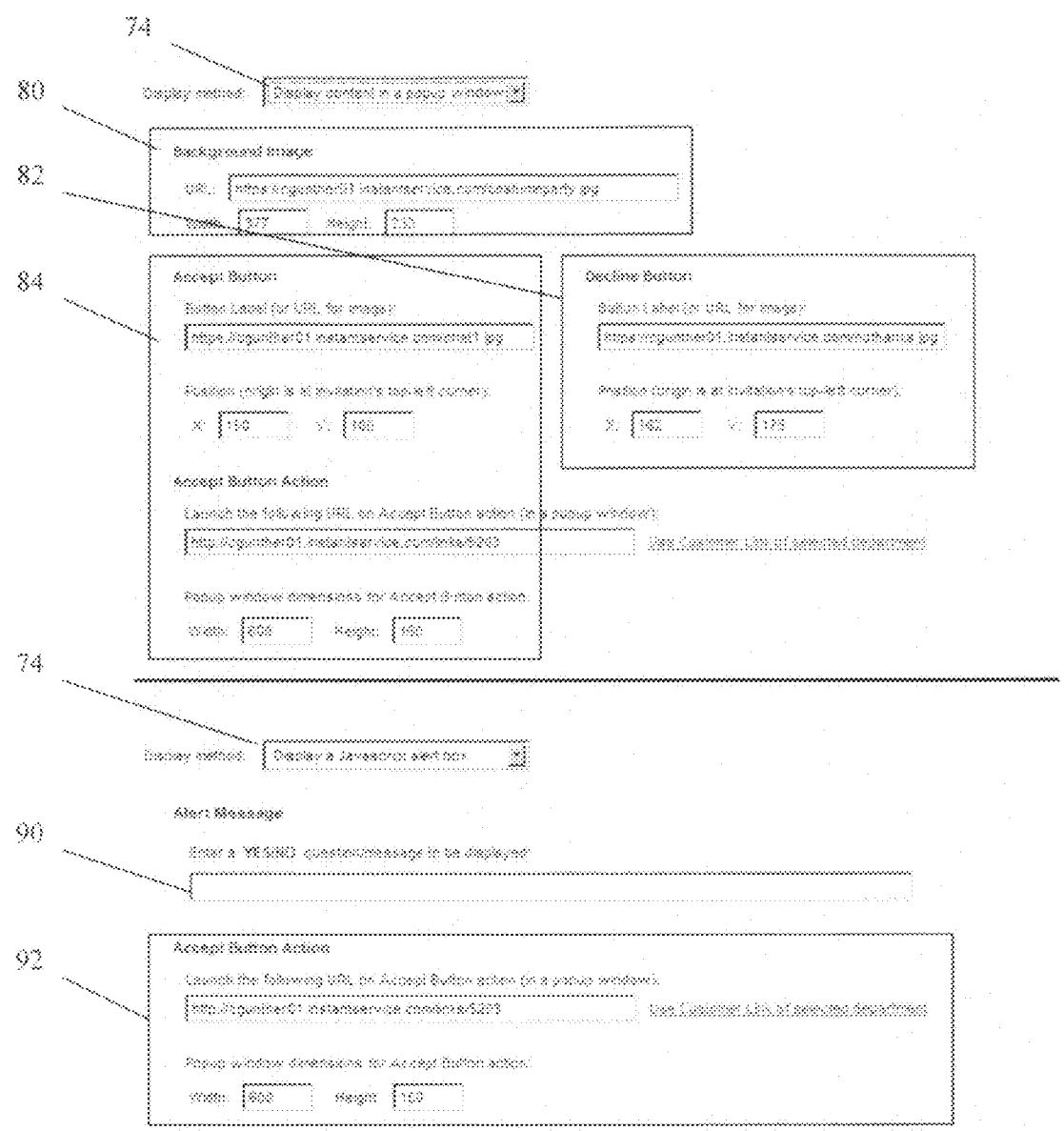
FIG. 9 is a screen shot for Customer interaction with one embodiment of the disclosed system and method.

A Customer has the option in list box 74 to choose to display the invitation content in a popup window. In FIG. 9 are illustrated the input objects used (in this embodiment) for the second method of showing an invitation discussed herein, to display content in a popup window. It is advantageous that when a Customer selects the popup window option from list box 74, these input objects are dynamically displayed, meaning they appear when the popup window option is selected and disappear when the popup window option is deselected. When using this option, the following information is filled in:

1) Background Image URL: A Customer enters data for the creation of the background image on the invitation by using the input objects in area 80. The Customer types into a text box the full URL to an image that the Customer would like to use as the background in their popup window invitation;
2) Background Image Width and Height: A Customer enters data for the creation of the background image on the invitation by using the input objects in area 80. The Customer enters the width and height of their background image (in pixels) into the text boxes. This background image size is the size of the popup window. If a Customer doesn't know the dimensions, they load the image in a Customer's browser, right click on it, select 'Properties', and it displays the image's width and height;
3) Accept Button Image URL (or text): A Customer enters data for the creation of the accept button on the invitation by using the input objects in area 84. The Customer types into a text box the full URL for an image to be used for the Accept button that will appear on the invitation. As an alternative a Customer may also just type in text (e.g. "Chat Now!") and an HTML button will be created instead of using an image;
4) Accept Button Position: A Customer enters data for the creation of the accept button on the invitation by using the input objects in area 84. A Customer types into a text box the x,y coordinates that the Accept button will appear in with the origin being the top-left corner of the popup window;
5) Decline Button Image URL (or text): A Customer enters data for the creation of the decline button on the invitation by using the input objects in area 82. The Customer types into a text box the full URL for an image to be used for the Decline button that will appear on the invitation. As an alternative a Customer may also just type in text (e.g. "No, Thanks!") and an HTML button will be created instead of using an image.
6) Decline Button Position: A Customer enters data for the creation of the decline button on the invitation by using the input objects in area 82. The Customer types into a text box the x,y coordinates that the Decline button will appear in with the origin being the top-left corner of the popup window;
7) Accept Button Action Launch URL: A Customer enters data for the creation of the accept button on the invitation by using the input objects in area 84. The Customer types into a text box the URL that will be used to launch the Internet relationship management enhancement environment customer chat client. The customer chat client module advantageously launches in a popup window (different from the invitation popup window).

A Customer has the option in list box 74 to choose to display the invitation content as a JavaScript alert box. In FIG. 9 are illustrated the input objects used (in this embodiment) for the third method of showing an invitation discussed herein, to display content as a JavaScript alert box. It is advantageous that when a Customer selects the JavaScript alert box option from list box 74, these input objects are dynamically displayed, meaning they appear when the a JavaScript alert box option is selected and disappear when the a JavaScript alert box option is deselected. When using this option, the following information is filled in:

1) Alert Message: A Customer types into text box 90 the text message that will be displayed when the invitation is to be shown (the text message is the invitation). Two options are available in JavaScript alerts, OK and Cancel, so the text message is phrased in way that fits those two responses. OK is the same as Yes, which when clicked opens a chat window. Cancel is the same No, which when clicked closes the JavaScript alert box.
2) Accept Button Action Launch URL: A Customer enters data for the creation of the accept button on the invitation by using the input objects in area 82. A Customer types into a text box the URL that will be used to launch the client. The client launches in a popup window.

It is advantageous that to use the customer link for the department for which availability is being checked, the Customer clicks the Use Customer Link for Selected Department link next to the URL text box. This pre-fills the customer link for the department as well as the appropriate width and height dimensions for the popup. If at a later time a Customer changes the department to check for availability, a Customer re-clicks the 'Use Customer Link for Selected Department' link so that the browsing user will come into the newly selected department, rather than into the previously selected one.

3) Accept Button Action Popup Window Dimensions: A Customer enters data for the creation of the accept button on the invitation by using the input objects in area 82. A Customer types into a text box the width and height dimensions for the customer chat client popup window that will appear. These settings match the dimensions appropriate for the customer client layout for the department, either classic (600×160), or expanded (500×320).

In some embodiments, the Accept Button Action input area 82 contains an input object allowing the Customer to choose between launching a URL in a window, and simply closing the invitation. If launching the URL in a window, the Customer can choose to open the URL in the original window (parent window for popup invitations and current window for DIV layer invitations), or open the URL in a popup window with specified dimensions. Closing the invitation is useful when the customer wants a non-popup window related action to occur. This can be implemented by calling custom program code, such as JavaScript for the Invitation Accepted event (see discussion of tracking events below).

In one embodiment, a set of predefined invitations has been created and configured for a Customer to use as a starting point in creating their invitation. The invitations are viewed by clicking on a 'View Predefined Invitations' link next to a 'Display Method'. A window appears and displays several types of invitations. Selecting one of the example invitations populates the page with the configuration for the chosen invitation. The Customer may leave the invitation as is or modify any aspect of it using input objects.

If a Customer wants to use the images found in the predefined invitations, it is advantageous for a Customer to save the images locally and move them over to a Customer's own production servers. This will increase flexibility later on if the Customer wants to change the images being used and will keep all served up content on the Customer's own servers.

Figure 10:
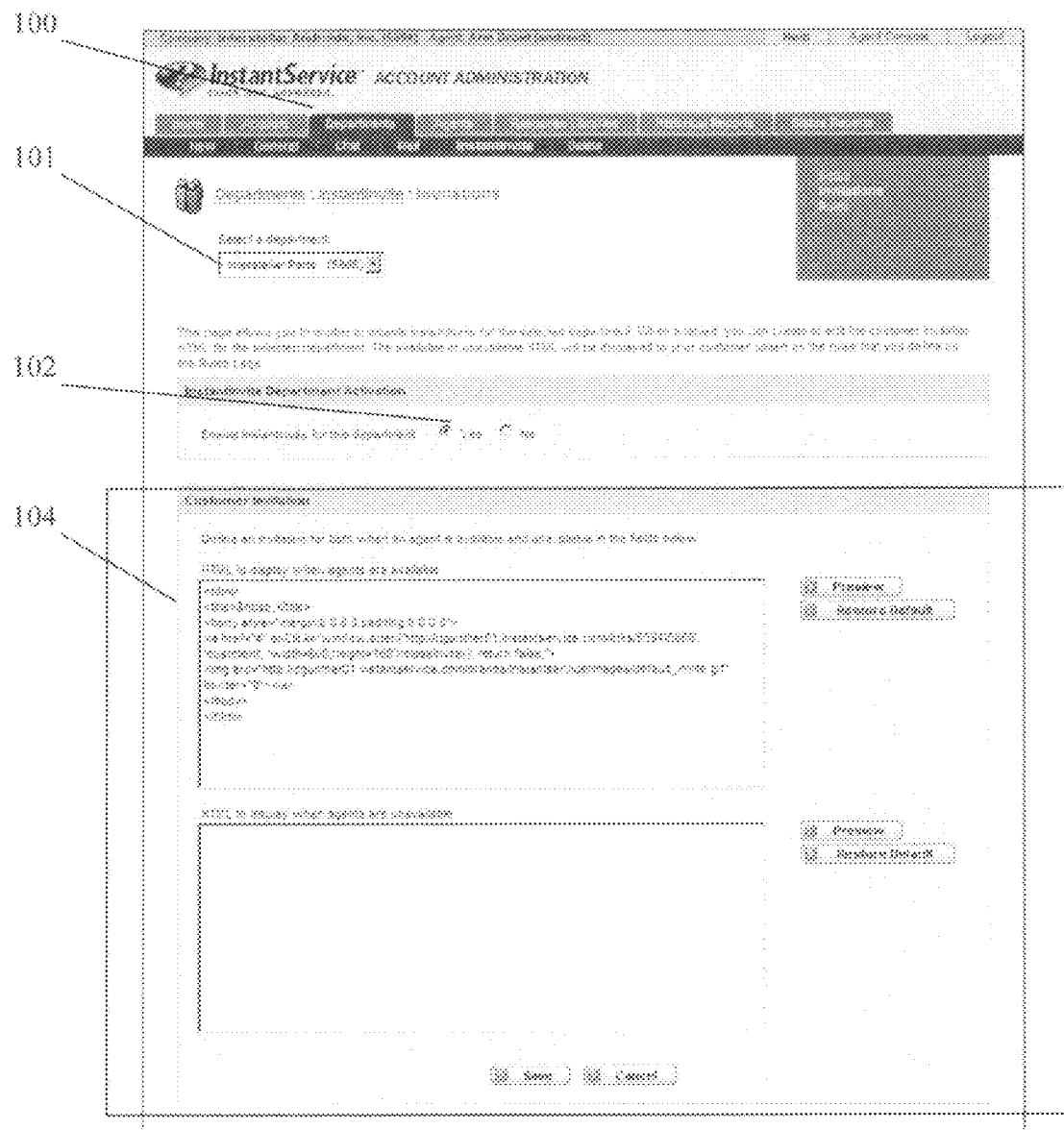
FIG. 10 is a screen shot for Customer interaction with one embodiment of the disclosed system and method.

In another embodiment, the creation of invitations is made through a department tab as illustrated in FIG. 10. The Customer begins by clicking tab 100. In this embodiment, as in the previously described embodiments, the role of the invitation is to act as the storage mechanism for the HTML content displayed to the browsing user when a rule is triggered. Both the method by which the invitation is displayed and when it is displayed are defined as part of the rules configuration.

It is advantageous for invitations to be created and edited from within an account administration utility. Under the rule based invitations portal within the Department's section, there is an invitations page as illustrated in FIG. 10. This page allows a Customer to enable rule based invitations for a department as well as create and edit the invitation HTML that will be used by the department.

In this embodiment, each department defines its own single invitation. The invitation for a department consists of two parts:

1) HTML content that is displayed when agents assigned to that department are available to chat with customers (queue is available); and
2) HTML content that is displayed when no agents are available to chat with customers in that department (queue is unavailable).

Before a Customer creates the Available/Unavailable HTML content for a particular department, a Customer enables that department to use rule based invitations. This is done by first selecting the department in drop down list box 101 that a Customer wants to enable, and then choosing the enable option by clicking radio button 102. Once a Customer has enabled the department, the fields for editing the HTML are dynamically displayed in area 104, meaning they appear when the 'enable the department' radio button 102 is selected and disappear when the enable the department option is deselected.

It is also advantageous for a Customer to be able to create or edit the HTML code that will be used in the creation of the department's invitation. Because an invitation may advantageously be a web page displayed to the browsing user, it can contain any valid web content including HTML, DHTML, JavaScript etc. In this embodiment, a file containing this web page content is sent to the browsing user's browser when an invitation is to be displayed.

Advantageously, default invitation HTML or pre-generated HTML are provided for a Customer in the 'Available HTML' text box in area 104 on the page illustrated in FIG. 10. Optionally, this default HTML displays a graphic inviting the user to chat with Agents of the department. When clicked, the chat link on this graphic launches the program code module for the department associated with the invitation. Optionally, the 'Unavailable HTML' text box is blank by default. Advantageously, the default HTML for either field is restored at any time by clicking a restore default button at the right side of the page.

A Customer previews the HTML content that will be used in an invitation by clicking on a 'Preview' button. A window appears that displays the general look and feel of the invitation. The preview of the invitation need not appear in the actual window size used when deployed because this is defined by the rules configuration.

It is desirable for a Customer to consider their rules configuration when defining their invitations. While the invitations generally define the what, the rules generally define how the HTML content will be displayed. It is important that the invitation used by the rule be designed to display properly within the window defined by the rule.

In the case of blank invitations, for example if the 'Available HTML' field is left blank for some reason, and a rule determines that the invitation for the department should be displayed to the user, optimally nothing will be shown. This same condition applies to the 'Unavailable HTML' field; optimally, if no HTML has been defined then nothing will be shown to the user. This is basically a desirable safety mechanism built into the system. As it is very unlikely that a Customer will want to display an empty box to their customer, the system is configured by default to detect if anything is to be shown before deciding whether to show it.

JavaScript support within invitations varies according to how a Customer decides they want the invitation to display. For example, if a Customer uses a popup window to display an invitation, there are generally no limitations on the JavaScript that a Customer can use within the invitation.

If a Customer displays an invitation using the DIV tag (layer) method, JavaScript support is generally not as flexible. A Customer does not define a Customer's own JavaScript functions within a <SCRIPT> tag as this code won't be available to the rest of a Customer's page. Optionally, as a workaround, a Customer still uses JavaScript code within the HTML tags themselves.

A typical invitation consists of an image link or form which launches a client module in a separate window. When the client module window is launched, a Customer may wish to close the invitation window. To assist with this task, it is advantageous to provide a built-in pre-defined function that can be called anywhere within a Customer's invitation's HTML content. This function either closes the popup window if a Customer's invite is shown in one, or closes (hides) the DIV layer content if a Customer's invite is shown in that manner.

Figure 11:
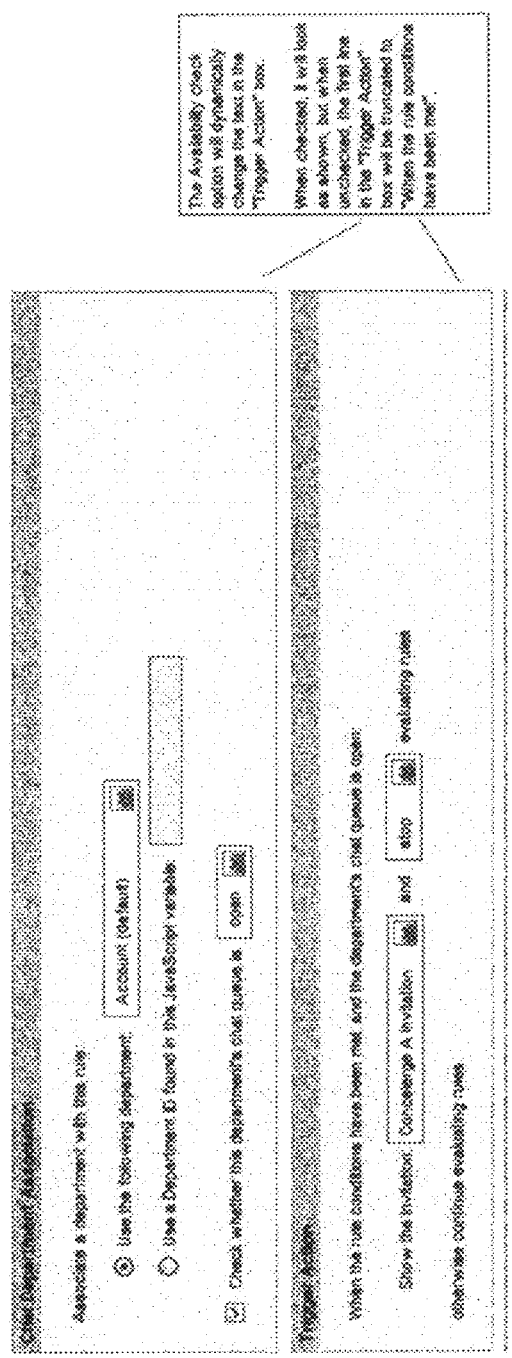
FIG. 11 is a screen shot for Customer interaction with one embodiment of the disclosed system and method.

FIG. 11 illustrates an alternate embodiment of the input objects used to configure the departmental assignment and programmatic events created depending on whether an Agent of that department is available or not. This embodiment differs in this discussion in that the department is associated with a rule and not an invitation. This allows a department to define its own rules and reuse them in multiple invitations.

Figure 12:
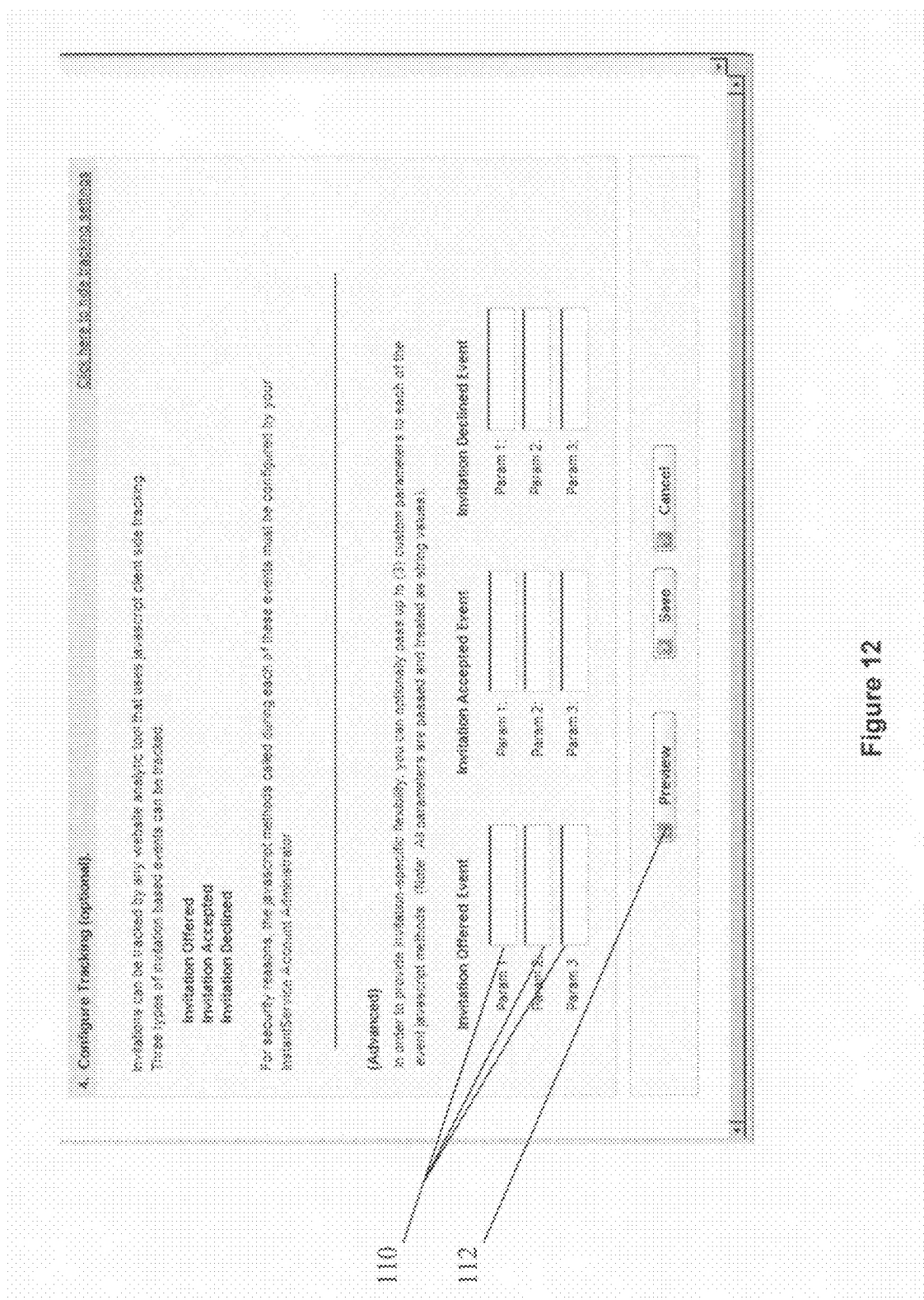
FIG. 12 is a screen shot for Customer interaction with one embodiment of the disclosed system and method.

FIG. 12 illustrates the fourth step in defining how the invitation will be displayed which is to configure tracking. As can be seen in FIG. 3a the tracking of various invitation events is optional. Should a Customer choose to track invitation events, it is preferable to allow for an output of data usable by any third-party analytics system that uses a compatible program language and that is configured to track relationship events.

Three types of invitation events are tracked: 1) Invitation Offered, 2) Invitation Accepted, and 3) Invitation Declined. The program code that is executed for each of these events is defined by the Customer's subscription account administrator (for security reasons).

In one embodiment, as part of the tracking of rule based invitations, a Customer passes up to three custom parameters to the program code event methods that are called when invitations are offered, accepted, or declined. The input page illustrated in FIG. 12 provides the Customer with input objects to define the details of the data passed to any third party analytics system tracking for each of these events through parameter input text boxes 110. This provides the ability to use specific ID's or names that a third-party analytics system may require to uniquely identify invitations. Because of the security concerns associated with running program code automatically upon events triggered by a browsing user, the input page illustrated in FIG. 12 is hidden by default. When a link is clicked, it expands the page and displays this section dynamically. The ability to preview the invitation is also available on this page by clicking preview button 112.

Figure 13:
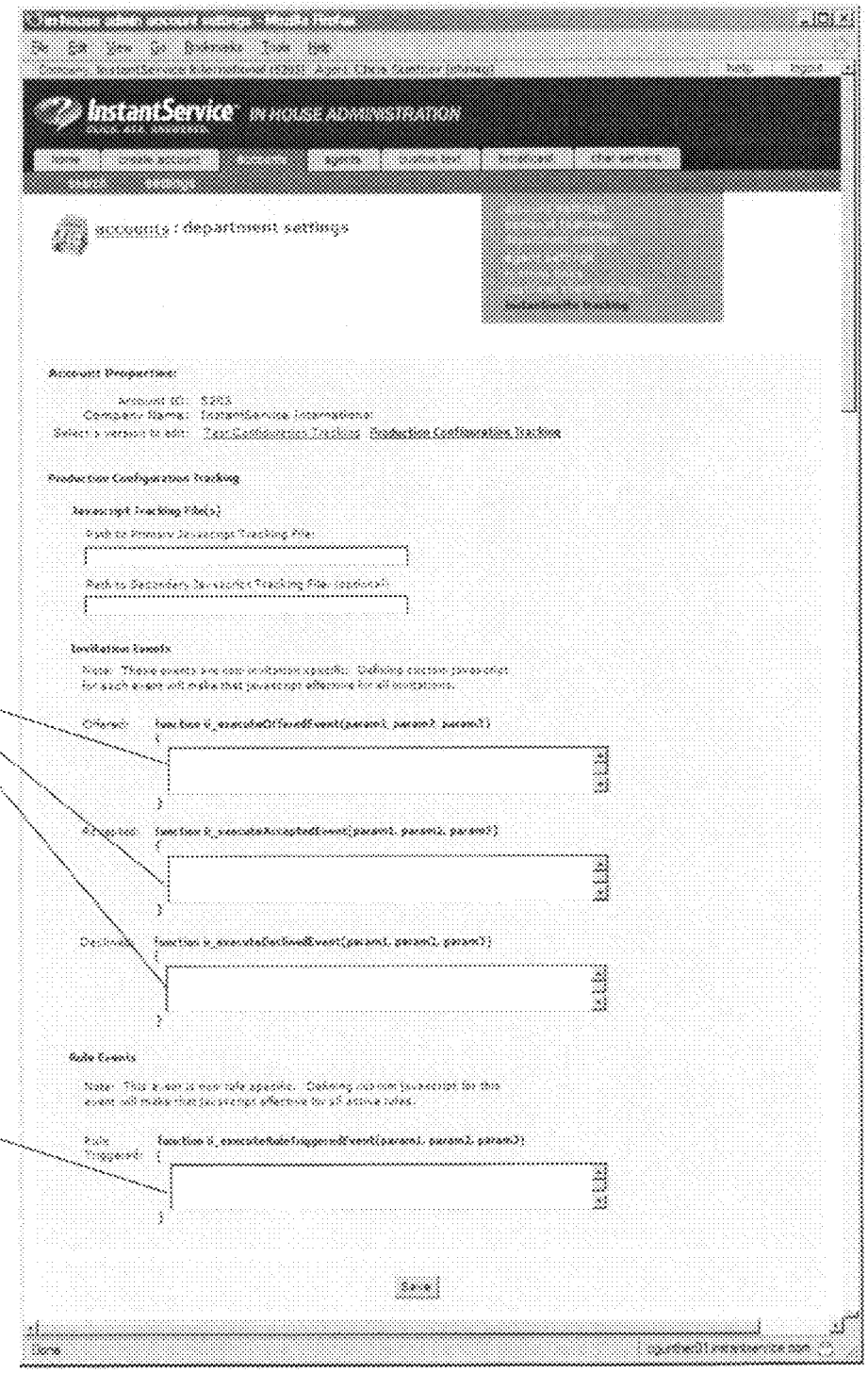
FIG. 13 is a screen shot for Customer interaction with one embodiment of the disclosed system and method.

It is advantageous to provide an input page for entering program code that will be run when tracking events occur. The page illustrated in FIG. 13 provides text boxes 120 for entering the program code that is executed when the invitation events are fired.

In addition to tracking when invitation events are fired, it is advantageous to track when a rule is fired. The page illustrated in FIG. 13 provides text box 122 for entering the program code that is executed when the invitation events are fired.

An extension of browser user tracking is the question of how long a Customer wants to keep the history of the browsing user on their web servers for tracking purposes. As a user navigates and browses through the Customer's web site, how long is the tracking data to be maintained for each browsing user?

Figure 20:
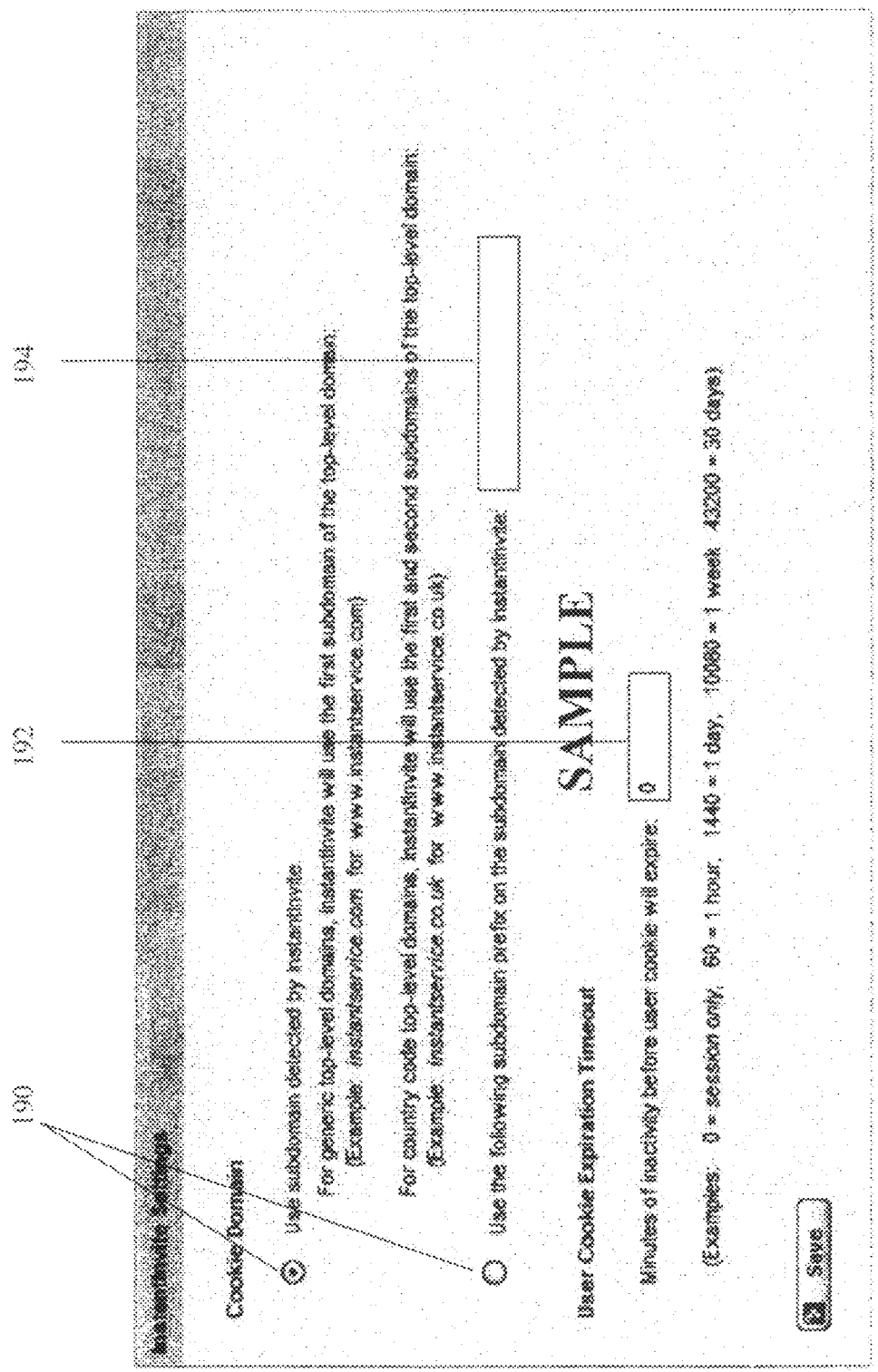
FIG. 20 is a screen shot for Customer interaction with one embodiment of the disclosed system and method.

FIG. 20 illustrates a set of input objects allowing a Customer to set the memory storage sites and expiration timeout for user cookies that will be used for storing tracking data. The Customer clicks one or the other of two exclusive radio buttons 190 to select a prefix for the sub-domain that will be used for the first party cookies required by the rules based invitation code module. If the user uses the sub-domain detected by the invitation module, the default cookie domain will be the top level domain of the Customer's web site that is running the invitation code module. The Customer may opt, however, to input a sub-domain into text box 194 and, in that case, the invitation program code module generated cookies will be stored using the prefix+the sub-domain.

The cookie timeout setting allows the Customer to specify how long the end user's browsing history will be kept (for the purposes of invitation generation). In this embodiment, the option is specified in minutes. A value of zero indicates the history will be maintained only for the browsing user's current browser session. Any number greater than zero indicates the number of minutes of inactivity from any Customer web pages that run the invitation code module before the browsing user's history is expired.

The cookie timeout value will be reset for any existing cookies of return browsing users each time a new invitation program code module is published. Publishing results in the return browser's invitation program code module being deleted.

The flowchart of Customer processes are continued in FIG. 3b. The first step in the Figure is to configure the rules that will trigger invitation events.

Within this disclosure "Rules" refers to conditions defined by a Customer for use on their web page that trigger when a user performs a certain action. A rule determines whether an invitation associated with the rule is shown to a user based upon one or more of the conditions being met by the user browsing the web site. For example, if a user visits a particular page, stays there for 30 seconds, and a rule condition is defined for this event, the rule triggers and displays an invitation to the user. Rules are extremely flexible and can be defined anywhere along a spectrum of simple conditions to complex conditions.

Figure 14:
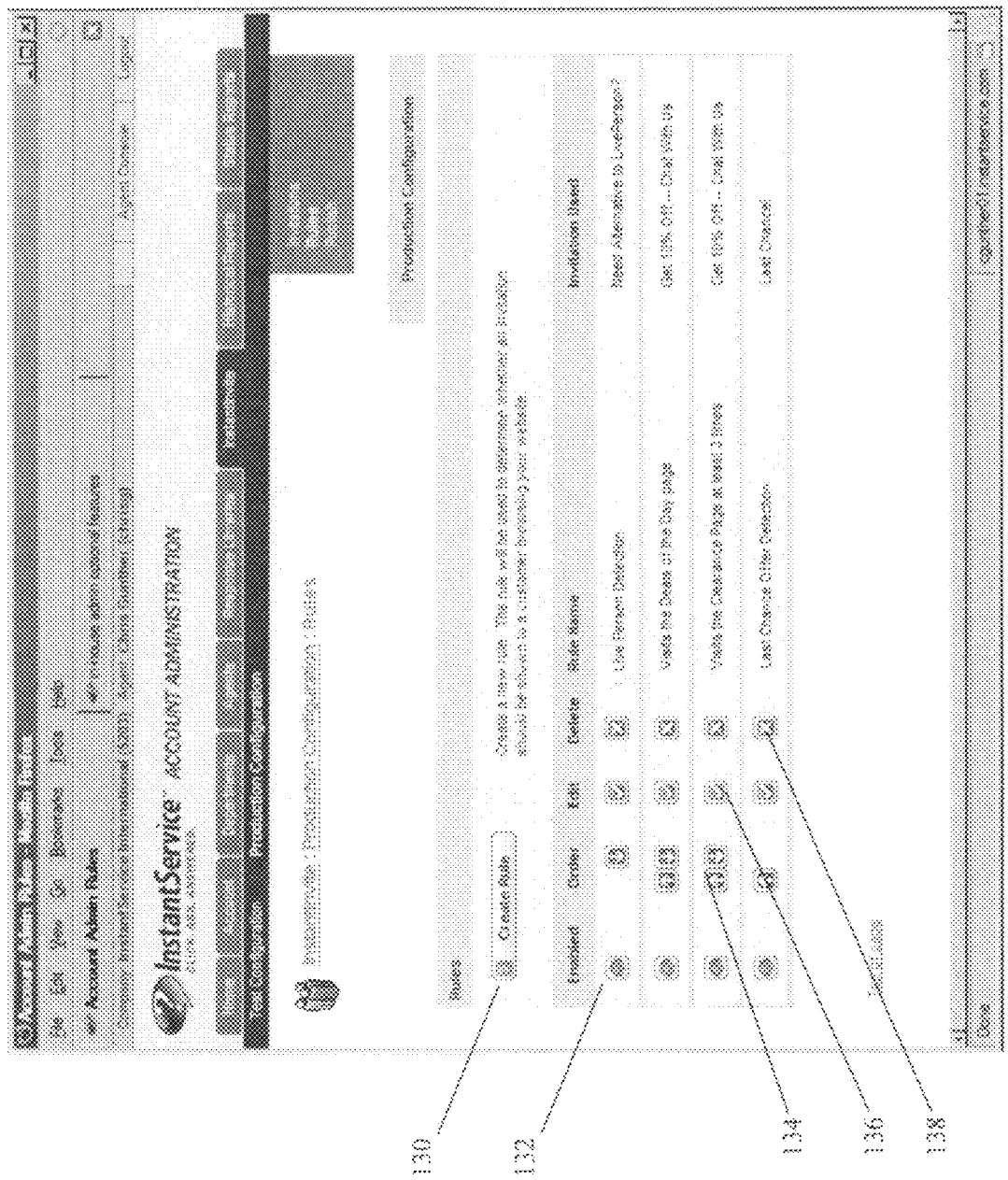
FIG. 14 is a screen shot for Customer interaction with one embodiment of the disclosed system and method.

In one embodiment, rules are defined on the rules page illustrated in FIG. 14 within the account administration functions of the system. FIG. 14 illustrates one example of a web page portal for defining rules. In this embodiment, the rules page illustrated in FIG. 14 provides a Customer with the ability to create new rules by clicking button 130, enable the rule for its assigned invitation by clicking enable button 132, reorder the rules so that they are evaluated by the rule based invitations engine in a different order by clicking edit buttons 134, edit a rule by clicking the associated edit button 136 and delete existing rules by clicking 138. It also provides a Customer with the ability to enable and disable the rules, as well as reorder the rules so that they are evaluated by the rule based invitations engine in a different order.

The rules are evaluated in the order in which they appear on the rules page illustrated in FIG. 14. Rule order is important if rules have conditions that overlap conditions set within other rules. A Customer may find that a rule is not being triggered and an invitation is not being shown because another rule has taken precedence over it. In such a case, the Customer reorders the rules on the page such that the rule with the higher precedence appears before the other rule(s) on the page illustrated in FIG. 14.

Advantageously, in this embodiment, rules are enabled or disabled within this page. Disabled rules are not in effect after the changes have been published. This is useful in situations where a Customer wants to temporarily disable a rule (i.e. if they're experiencing heavy usage).

Optionally, whenever changes to rules or invitations occur, a Customer re-publishes in order for the changes to be made visible to browsing users on a Customer's web site. In some embodiments, program code that is created when rules are published is set to be cached within the user's browser for the duration of the browsing session. When the rules are re-published, the old rules remain cached until all instances of the browser are closed.

Figure 16A:
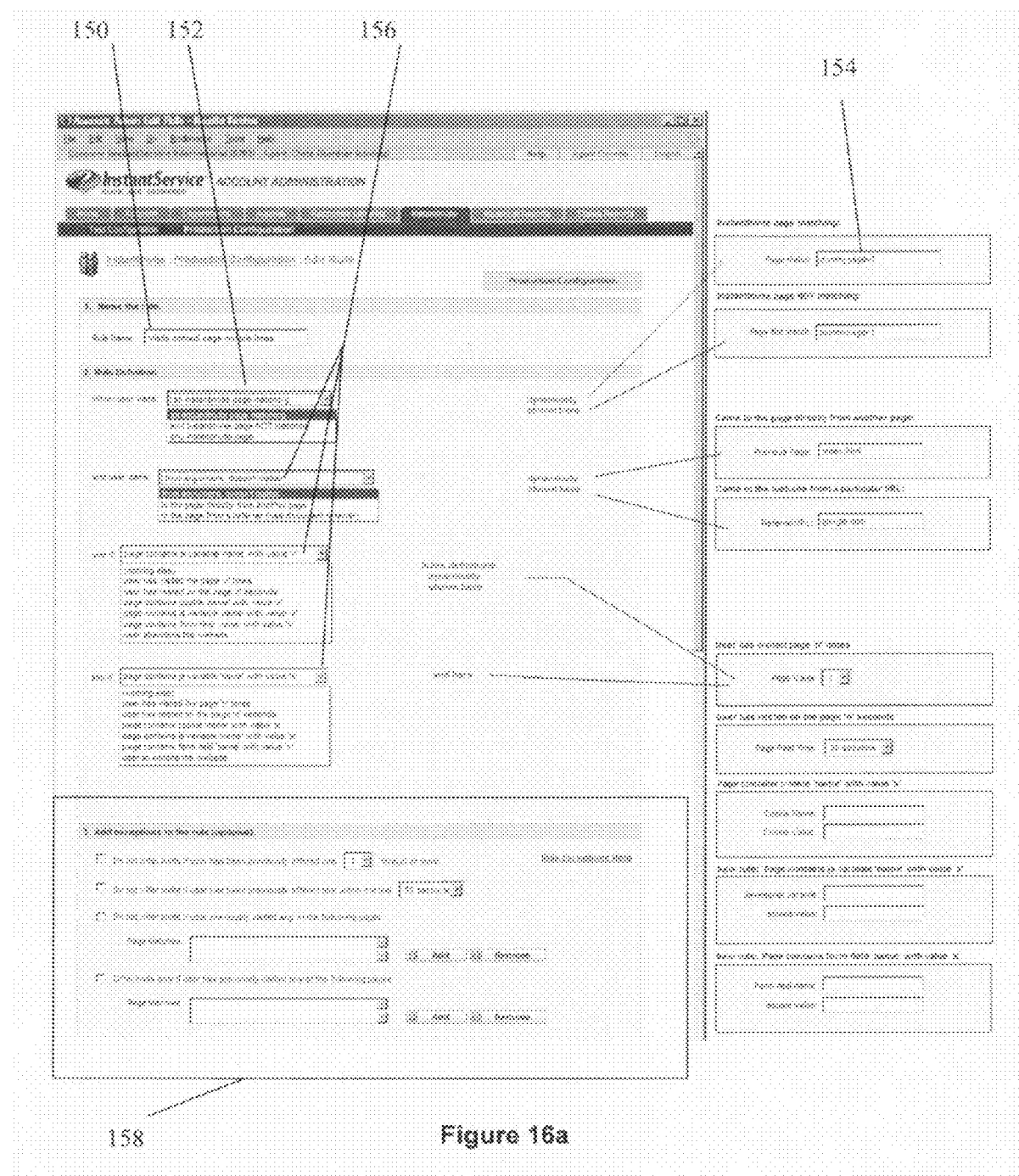
FIG. 16 is a screen shot for Customer interaction with one embodiment of the disclosed system and method.
Figure 16B:
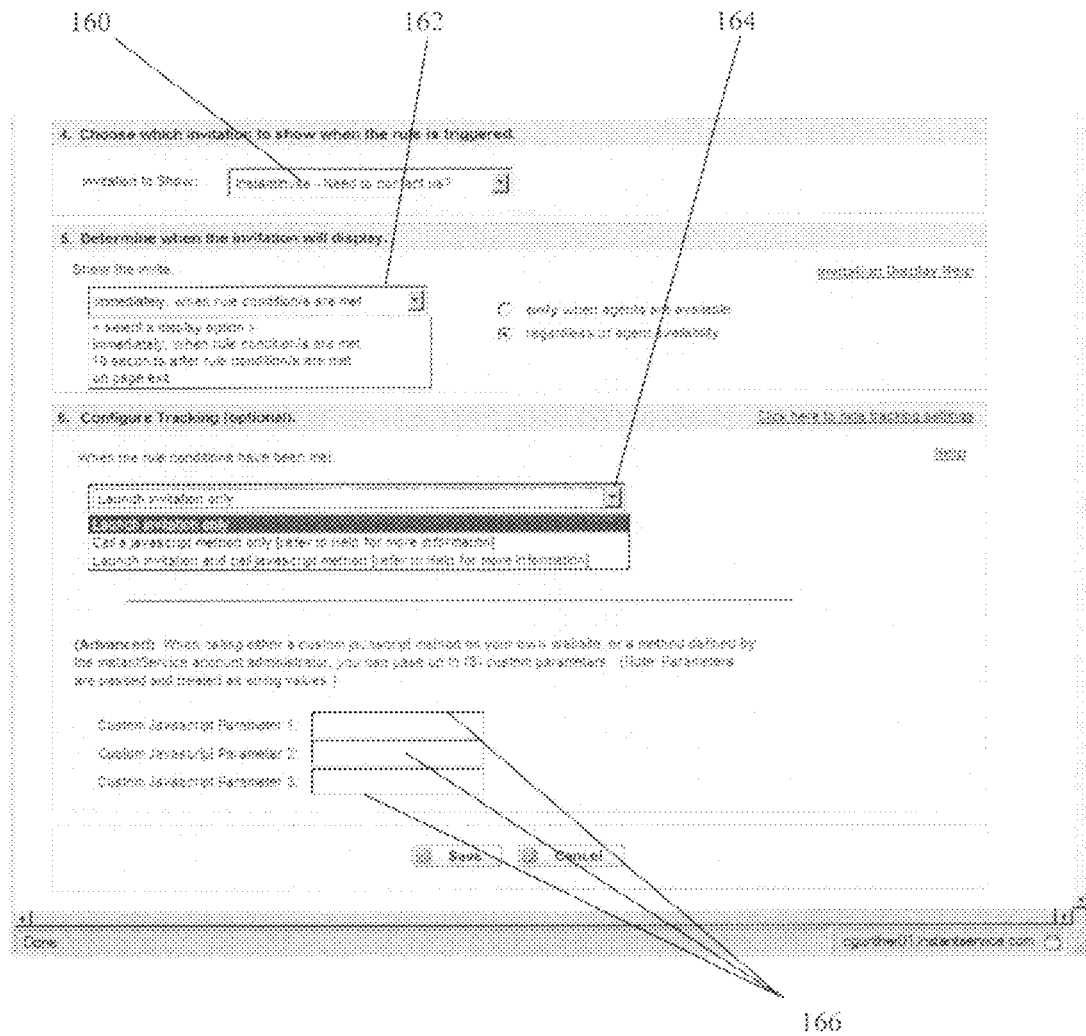

FIGS. 16a and 16b illustrate a set of input objects to which a Customer is navigated to create a rule by clicking on the create rule button 130 on the rules page illustrated in FIG. 14. A Customer edits an existing rule by clicking on one of the edit button 136 in the rule list. When a Customer is creating or editing a rule they are also taken to the create or edit rule page illustrated in FIGS. 16a and 16b. The process for configuring a rule's definition is divided up into several steps with each step and it's purpose described below.

The first step, is to name the rule using an input object like rule name text box 150. Each rule is given a name that describes itself so that it can be easily found on the rules page illustrated in FIG. 14.

The second step, is to define the rule. A rule consists of a set of conditions that have to be met on a web page in order for that rule to activate, or "trigger". Once a rule has triggered it will show an invitation (if configured to do so). The set of conditions are composed of a number of elements, elements including navigational conditions, cookies, JavaScript variables, form field variables and any other variables well known in the art or later developed.

In the interactive input page illustrated in FIG. 16a, Customers select from a number of drop down list boxes and other input objects. Their selections and other data input are later integrated into the programmatic code that determines whether an invitation will be presented to a user browsing the Customer's web pages or not. As Customers select conditions from the drop down lists and enter data, "nested" programmatic relationships are established. The conditions established have programmatic relationships which can be translated into code structure in the context of generating an invitation, such as "If", "And If", "Else If", "Not If" and other logical operators well understood by those skilled in the art. In addition, each condition selection from a drop down list box (or other input object) may trigger one or more additional dynamically created input objects for the Customer to provide condition data. In this sense then, the input objects are desirably "nested" as well. For example, selecting "page matching" from list box 152 triggers text box 154 to be displayed to the Customer so that they may enter the URL of the page to be matched. Rule conditions can be combined into a great number of unique configurations. The following is not intended to be an exhaustive list and those skilled in the art will appreciate there are many conditions which could be incorporated into the disclosed system and method. Some of the conditions illustrated in FIG. 16*a* are:

a) When a user visits a Customer's web page matching. This option allows a Customer to detect when a user visits a web page and part of the URL to that web page contains a certain string of characters. A Customer does not need to match the entire URL, only the smallest part of it that uniquely identifies the page to this rule.

b) When a user visits a Customer's web page NOT matching. This option allows a Customer to detect when a user visits a web page and part of the URL to that web page does not contain a certain string of characters. This is useful with more advanced rules, such as when a Customer wants to detect when a user strays from a particular path within a Customer's web site. For example, if a Customer's web site is setup to have the users fill in a series of forms "Page A followed by Page B", and a Customer wants to know if a user visits Page A but does not go to Page B, a Customer would define the rule as follows: "When a user visits a Customer's web page NOT matching 'Page B', and user came to the page directly from another page 'Page A'".

c) When a user visits any rule based invitations page. This option allows the rule to operate regardless of the URL of the web page. Any rule based invitations enabled page would meet this part of the rule condition and would continue to be considered when evaluating other aspects of the rule definition.

d) When a user visits and the user came from anywhere; it doesn't matter. This option allows a Customer to disregard the page that the user previously visited. The rule does not take into consideration the previous page when evaluating the conditions of the rule.

e) When a user visits a page and the user came to the page directly from another page. This option allows a Customer to detect if the user was on a particular page immediately before the current page was visited.

f) When a user visits to the page from a referrer (use "document.referrer"). This option allows a Customer to detect if the user was previously on a certain page just before visiting the current one. It is very similar to the "directly from another page" option, however, it differs in that it does not use the rule based invitations engine to determine which page the user was previously on. Instead, it looks at the common browser-standard "document.referrer" setting. The document.referrer is stored by the browser whenever a user follows a link within a web page. It contains the URL string value of the page that a user linked from, however it will be blank if the user reached a page via some means other than by linking (i.e. form post, bookmark, typing a URL into the browser, etc). This rule option is particularly useful in detecting whether the user came to the web page from a different site by following a link, such as a link followed through a search engine.

g) Every 'n' number of pages a user visits on a Customer's web site. After the user visits 'n' number of pages, the invite is shown in the manner defined in the rule. Optionally, the invite is shown again after the user visits another 'n' number of pages. Before the rule determines that an invitation is to be shown, it checks for exceptions that may have been defined for the rule.

h) When the user visits a page that contains a value (Page A) as part of the URL at least 'n' number of times. The value defined for the Page A parameter can be all or part of the URL of the visited page.

i) Total Time on Site Rule. Companies, such as QuickenLoans, would like to offer an invitation to visitors who have been on their website after an amount of time has elapsed, regardless of the number of pages visited or the amount of time spent on any particular page. The current "Time on Page" rule resets every time the page is loaded. The "Total Time on Site" condition will keep track of the cumulative amount of time the visitor has spent on the website.

j) Conditional and Comparative Operator Support in Rule Condition Fields. Nearly all companies using InstantInvite would like to define rule conditions using comparative operators, such as a shopping cart value "greater than" a specified amount. Many companies would also like to specify more than one matching or comparative value to evaluate per condition, such as the document.referrer containing the keyword "instantservice" or "instant service".

k) Geography Based Rule. Many companies, such as QuickenLoans, Carmax and Overstock, would like to exclude or offer invitations to visitors based on their location, typically a country or US state, although other parameters that can be derived from the visitor's IP address may also be used, such as their city, domain name and connection-type.

l) Global Rule Exclusions. Companies, such as QuickenLoans and Overstock, do not ever want their own agents or competitors to receive invitations. Often, agents browse the website to assist customers. Having invites appear to agents dilutes conversion reporting data and causes disruptions.

m) Invite Specific Offered/Declined Exceptions. Some companies using InstantInvite, such as Overstock, drugstore.com and MarketLinc, would like greater control over the "invitation previously offered" exceptions. Currently, a rule exception can be configured to not display an invitation if ANY invitation has been previously offered once or a number of times. Customers want to have a condition to base the exception on the number of times the same (this) invitation has been offered.

Those skilled in the art will appreciate that many other programmable conditions exist. Many of those conditions can be programmed to satisfy an "If" operator. For example, one or more of the above conditions may be combined with the following "And If" conditions:

a) If nothing else. This option is provided if a Customer does not want to provide any additional conditions to a Customer's rule.

b) If a user has visited the page 'n' times. This option checks how many times a user visits a web page where part of the URL to that web page contains a certain string of characters. If the user exceeds a certain threshold of visits, the rule triggers.

c) If a page contains cookie 'name' with value 'x'. This option checks if a cookie with a particular name is set that has part of it's cookie value matching a particular value. The cookie value examined is only a "substring" of the whole value, caution is used in assuring that the string a Customer is looking for is unique enough that it won't be found when it shouldn't be. Advantageously, the rule based invitations engine checks the value in the cookie every 5 seconds, so if the value changes to the desired value, the rule triggers within 5 seconds of the change.

d) If a page contains JavaScript variable 'name' with value 'x'. This option checks to see if the visited web page contains a declared JavaScript variable with a particular name and the value for that variable is a certain value. The rule based invitations engine checks the value in the form field every 5 seconds, so if the JavaScript variable value changes to the desired value, the rule triggers within 5 seconds of the change.

e) If a page contains form field 'form.fieldname' with value 'x'. This option checks to see if the visited web page contains either a visible or hidden form field that contains a certain value. The rule based invitations engine checks the value in the form field every 5 seconds, so if a user types into a text box the desired value, the rule triggers within 5 seconds of the change. Advantageously, the form field name includes both the name of the form and the field name (e.g. myForm.myFieldName).

f) If a user abandons the web site. This option detects if the user attempts to leave the web site. In general, this option detects web site abandonment if the user exits the web site by typing in a URL in the browser locator, following a bookmark, or closing the browser.

Advantageously, various conditional options are repeatedly applied to further define the rule (such as, by further "nesting" conditions). In FIG. 16a, three "And If" logical operator type list boxes 156 follow "If" logical operator type list box 152. This allows Customers to define compound rules that use multiple conditions. For example, a compound condition require that a user has visited page 'x' five times and page 'y' three times before a chat invitation is triggered. Advantageously, multiple operators are combined or repeated within the set of conditions, programming principles well known to those skilled in the art.

The third step in defining a rule is to add exceptions to the rule. The input objects in area 158 of FIG. 16a are illustrative exceptions. This step is optional. Each rule can define one or more "exceptions to the rule" that prevents the rule from showing, even if the defined conditions are all met. Rule exceptions therefore correlate to "Not If" type logical operators. Examples of such exceptions are:

a) Do not offer an invite if a user has been previously offered one 'n' time(s) or more. This option allows a Customer to prevent offering an invitation if one has been previously offered to a user a certain number of times before. The previously offered invitations could be any, the exception is not specific to any one particular invitation having been offered before.

b) Do not offer an invite if a user has been previously offered one within the last 'n' seconds. This option allows a Customer to prevent offering an invitation if one has previously been offered within a certain number of seconds. The previously offered invitation could be any, the exception is not specific to any one particular invitation having been offered before.

c) Do not offer an invite if a user has previously visited any of the following pages. This option allows a Customer to prevent offering an invitation if the user has previously visited a particular page before.

d) Offer an invite only if a user has previously visited at least one of the following pages. This option allows a Customer to prevent offering an invitation to a user that hasn't visited a particular page before.

The rule configuration process continues in FIG. 16b. The fourth step, in configuring a rule is to choose which invitation to display when the rule is triggered. Every rule can be associated with an invitation that is shown if the rule conditions are met and the rule triggers. In this embodiment, Customers input the invitation that should be generated by selecting it from drop down list box 160 which allows selection from previously defined invitations. In this embodiment rules and invitations are limited to a one to one relationship. While this allows a Customer department to have many invitations, it limits the use of a rule to one invitation.

The fifth step, in defining a rule is to determine when the invitation displays. A rule defines which invitation to show as well as when it should be shown. Customers select from drop down list box 162. Several options are available. For example, a Customer chooses to show the invite:

a) Immediately, when the rule conditions are met. Advantageously, for several of the rule types, a client decides when they want an invitation to be shown to a user if a rule evaluates to true.

If a client chooses the "on Page (A or B) exit" option, the invitation it is advantageous to display via a "pop-up" window. With this option, the invitation is shown immediately after the rule conditions are met and the rule triggers.

b) 'n' seconds after the rule conditions are met. This option shows the invitation a certain number of seconds after the rule conditions are met and the rule triggers. In this example, it is advantageous that, if the user navigates away from the page before the number of seconds has been reached, no invitation is shown.

c) When a user exits the page. This option shows the invitation when the user leaves the page after the rule conditions are met and the rule triggers. This is useful for invitations that are shown in a popup window or that use a JavaScript alert. Advantageously, a "When a user exits the page" option uses the browser's built-in "on Unload" event functionality of the page integrated with rule based invitations. If a Customer's page contains custom program code that performs its own on unload functionality, the rule based invitations on unload may unintentionally override a Customer's own. If a Customer wants to have a Customer's on unload functionality on the page in addition to the rule based invitations module functionality, a Customer optimally defines a custom program function that uses the following name and add it to a Customer's page. In one embodiment, the rule based invitations module provides its own version of this function that is called after an invitation is shown.

d) When a specified page of a client's web site loads.

e) 'n' seconds after a specified page of a client's web site loads, and f) When the user exits a specified page of a client's web site.

Regarding displaying invitations, a rule has the ability to display the invitation in a manner best suited to the web page on which it will be displayed. In this embodiment, there are advantageously three methods in which invitations are displayed. These are as follows:

1) Using a popup window. When a rule determines that an invitation is to be shown, a popup window appears containing the invitation defined in the rule. If a Customer selects this option, a Customer optimally specifies both the width and height of the popup window that appears. Advantageously, a Customer decides whether they want the invitation to display regardless of whether agents are available or not, or only when agents are available. Optimally, a default method is to only show invitations when agents are available. In some cases however, a Customer wants to present a user with a different page when agents are not available. In preferred embodiments, if a Customer select the "regardless of agent availability" option and no agents are available, the HTML that is displayed in the popup window is pulled from the customer invitation's "Unavailable HTML" field.

2) Using a DIV tag (layer). When a rule determines that an invitation is to be shown, a pre-defined, hidden DIV layer window is made visible that contains the customer invitation defined in the rule. Optionally, if a Customer selects this option, they specify both the width and height of the DIV layer window that appears. Advantageously, a Customer decides whether they want the invitation to display regardless of whether agents are available or not, or only when agents are available. Optimally, a default method is to only show invitations when agents are available. In some cases however, a Customer wants to present a user with a different page when agents are not available. In preferred embodiments, if a Customer select the "regardless of agent availability" option and no agents are available, the HTML that is displayed in the popup window is pulled from the customer invitation's "Unavailable HTML" field.

3) Execute custom JavaScript. This option allows a Customer to enter their own custom JavaScript that is executed when the rule determines that the invitation is to be shown. This provides a Customer with the ability to display invitations in a number of different ways, and it is desirable that a Customer test their setup on an internal site first. This allows a Customer to verify that their JavaScript does not contain syntax errors and is compatible with all browsers their web site supports.

The sixth step, which as can be seen in FIG. 3b is an optional step, in defining a rule is to configure Tracking. FIG. 16b illustrates a set of input objects for selecting and entering data and requirements for this step. It is advantageous for the rule based invitations module to be configured to use a third-party analytics tracking system to track when rules are triggered (and when invitations are offered, accepted, or declined). Optionally, the third-party analytics tracking system uses a compatible program code on the client side to track things, such as JavaScript. In this embodiment, when the rule conditions are met a Customer performs one of several actions. A Customer selects an action from drop down list box 164 to be performed when the rule conditions have been met. For example, actions could be:

a) Launch invitation only. This option is the default option for a newly created rule. When a rule's conditions have been met and the rule triggers, the rule simply attempts to launch and show the invitation to the user. In this case, custom JavaScript is not called.

b) Call a JavaScript method only. A rule is configured to show the associated invitation by using this option. Instead of showing the invitation, the rule executes custom JavaScript. The custom JavaScript can do almost anything that JavaScript can do on a regular page (including calling events on other servers). This option is used when integrating into a third-party analytics tracking system. Optimally, for security reasons, a Customer's account administrator configures the JavaScript that is called with this method.

c) Launch invitation and call custom JavaScript. This option shows the invitation when the rule conditions are met, as well as execute custom JavaScript. This option is used when integrating into a third-party analytics tracking system. Optimally, for security reasons, a Customer's account administrator configures the JavaScript that is called with this method.

d) If a Customer is executing custom JavaScript, a Customer passes custom parameters to a method being called. Each rule has it's own set of custom parameters that help identify it within third-party analytics systems. An advantageous method of transfer is to require that all custom parameters are passed and treated as string values. The passing of parameters for tracking when it is initiated by a rule firing has already been discussed above relevant to FIG. 13. The parameters used in the custom program code input into text box 122 on the page illustrated by FIG. 13 are input here, on the page illustrated by FIG. 16b. For this method, where the firing of a rule is the initiating event, the Customer inputs the parameter names into text boxes 166.

An alternate input process and data structure for configuration of rules and structuring the invitation, rule, conditions data relationship is illustrated in FIGS. 15a, 15b and 15c. In this embodiment, the same rules can be assigned to a plurality of invitations. The conditions for each rule have their own database table and separate set of input objects, allowing conditions to be easily rearranged in a desired order for programmatic execution.

The entry into the process illustrated in FIG. 15a. Drop down list box 140 is provided (this object could also be a "picker"), displaying to the Customer a list of all rules previously created and available for edit. Selecting a rule from this list changes the current rule being edited. The first, and default selection, in this list allows the user to create a new rule.

In FIG. 15b, the input of the rule name into text box 150 is as described in other embodiments above, but the description input text box 142 is an added aid to recognizing the rule purpose. This is of importance, since, in this embodiment, it is possible to assign a defined rule to more than one invitation, saving data input time for Customer do not have to re-enter the rule configuration data if they want to re-use them for multiple invitations directed to multiple departments.

In FIG. 15c, it is illustrated that one rule supports many conditions in this embodiment. The order of the conditions is not important hence there is not need for an order input object. The rule conditions will be evaluated using 'AND'. This means in order for a rule to be triggered all conditions must be met.

In FIG. 15c, Customers select or deselect a condition to apply to the rule they are configuring by clicking edit button 144 or delete button 146 respectively. In this embodiment, selections are made from and data input to the input objects in area 148. When the Customer clicks edit button 144 or alternately an add button, the input objects in area 148 are dynamically displayed, meaning that they "appear" only when an edit or add are input by the Customer. Furthermore, the input objects displayed are dependent on selection of condition type from the drop down list box and condition selection as well. FIG. 17 is a schematic illustration of the following process (see also FIG. 15 for some of the following numeral references). The Customer is viewing conditions list 147, no input objects are being displayed in area 148. The Customer clicks edit button 144 and drop down list box 141 is dynamically created by a context sensitive "in place editor". The Customer selects "Current Location Conditions" from drop down list box 141 and drop down list box 143 is dynamically created. When "User visits a page at least 'n' times with URL 'x'" is selected in drop down list box 143, the remaining input objects in area 148 are dynamically created. Clicking save button 149 adds the configured condition to list 147 above. Behind the scenes, a Rules Conditions table outlines the supported rule conditions. Listed with each rule condition are the details of the associated parameters including the type, multiple value support within a parameter, the default value, minimum and maximum value, and supported operators.

In summary the conditions section of the page illustrated in FIG. 15c allows the user to add, edit, and delete conditions for a rule. The condition selection is grouped by type. The rule conditions "in-place-editor" is context-sensitive and displays condition settings depending on the type selection and the definition of the condition as defined in the Rules Conditions spreadsheet. Changes made in the Conditions section of the page may be saved separately from modifications to the other sections of the page illustrated in FIG. 15c.

Before a Customer can use an invitation, or any of the rules and tracking data that they have input by interacting with the input objects, the Customer sends the data to the service provider who generates an invitation program code module that the Customer deploys to their web servers (either a test server as already discussed or a live production server). The invitation program code module is built to contain the logic and code for offering and hosting the invitations the Customer has configured in the processes illustrated in FIGS. 3a and 3b. Advantageously, the invitation program code module that a Customer receives from the service provider and integrates into their web site is generated specifically for a Customer's subscription account by the service provider through a code generation engine configured to automatically generate the invitation program code module given the invitation setup data in the format resulting from the previous processes.

Optimally, whenever a Customer makes changes to a Customer's rules or invitations, a Customer has the invitation program code module regenerated by going to one of the Publish pages. FIG. 4 illustrates the route a Customer takes to publish their invitation program code module. The publish link found in area 34 will navigate the Customer to a publish page that will publish to a test server. The publish link found in area 36 will navigate the Customer to a publish page that will publish to a production server.

Figure 18:
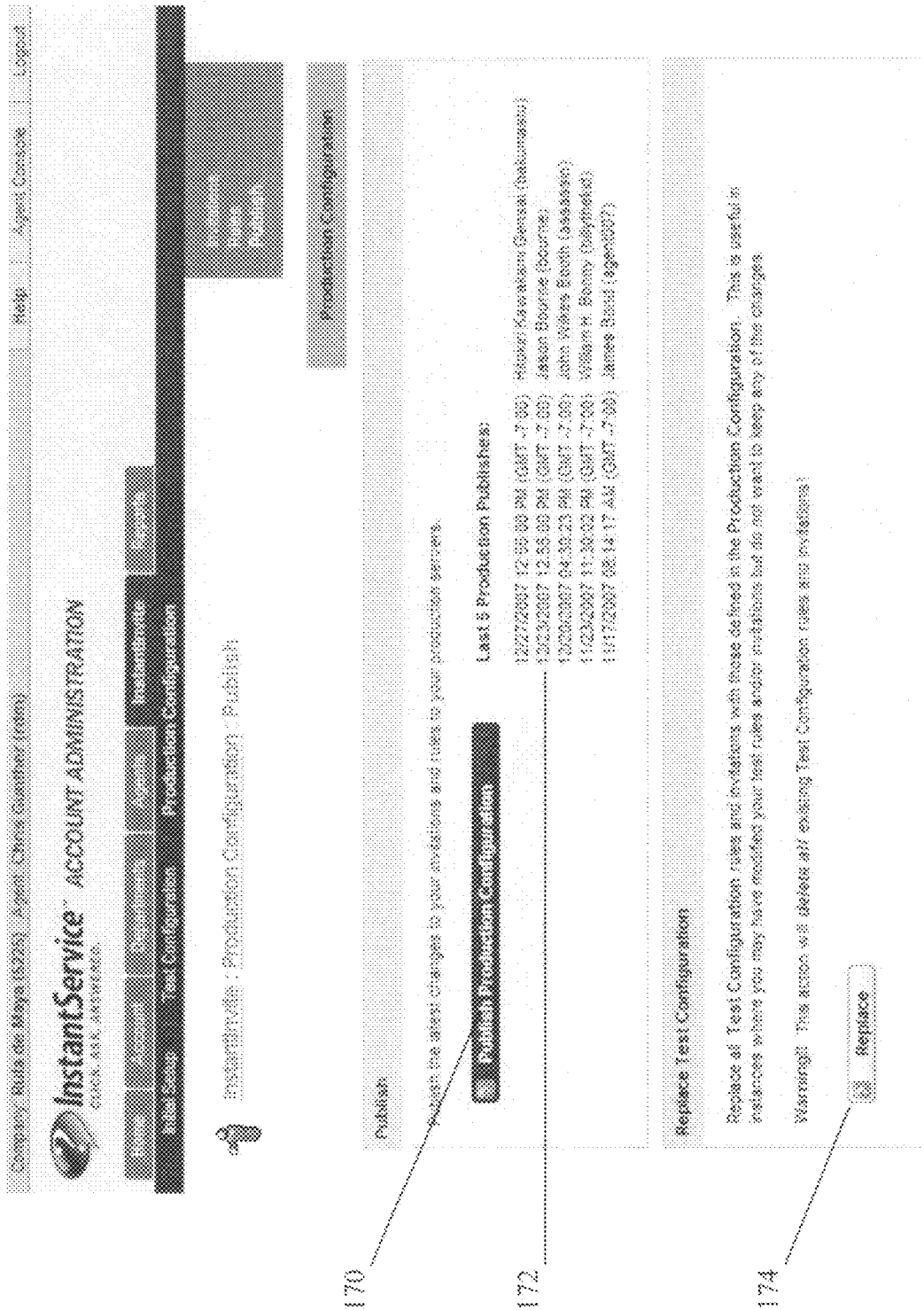
FIG. 18 is a screen shot for Customer interaction with one embodiment of the disclosed system and method.

FIG. 18 illustrates the input objects for publishing to the live production servers. The Customer clicks the publish production configuration button 170 and this will trigger the process of sending the selected and input data to the service provider and running the service provider's code generation engine. After the program code is generated and returned to the Customer, the Customer is prompted to save the invitation program code module to a Customer's local hard drive. Once the code module has been generated and saved by the Customer locally, a Customer moves the generated invitation program code module to the servers that host a Customer's web content. The invitation program code module is similar to other invitation program code modules a Customer may already have on a its servers, and it is desirable to allow a Customer to determine where the module should be put it on its own web server.

FIG. 18 also illustrates the input objects which allow a Customer to replace all test configuration rules and invitations with those defined in the production configuration. This is useful in instance where a Customer may have modified the test rules and invitations but do not want to keep any of the changes. The Customer clicks replace button 174 and all existing test configuration rules and invitations are deleted. Advantageously, the Customer makes changes to rules and publishes to test for testing purposes. Replace button 174 allows a Customer to restore the system back to a previous state if they determine that the changes that were being tested should not be published to the live system. In effect, the replace button 174 re-establishes all existing live system rules and discards any of the changes that have been made since the last replace test configuration occurred. Once this button is clicked, both the test rules and the live rules are the same.

The Customer can also reference the deployed files in the code which generates the web pages on their web site. In an HTML/JavaScript environment, one way to do this is to use <SCRIPT> tags on the web pages on which the Customer wants to generate invitations and track users. In this instance, the pages that do not contain the <SCRIPT> tags will not be available for consideration when invitation rules are evaluated.

Figure 19:
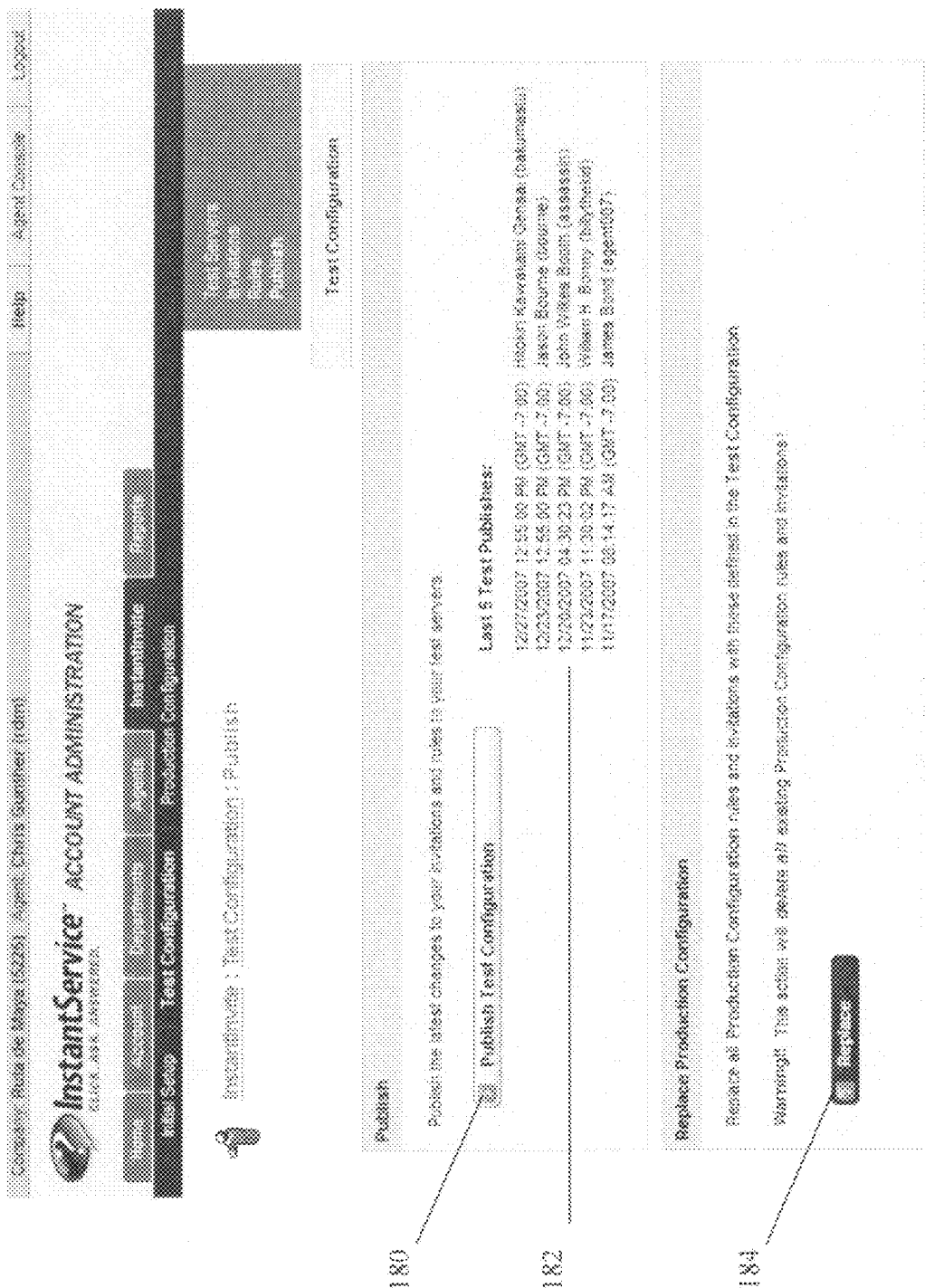
FIG. 19 is a screen shot for Customer interaction with one embodiment of the disclosed system and method.

FIG. 19 illustrates the input objects for publishing to the test servers. The publish test configuration button 180 allows the Customer to make changes to the rules in the summary list, as well as add and delete rules from the list without affecting the live production system that may be being used by the browsing users and agents of the web site. Any changes that are made that are published using the publish test configuration button 180, are published to a separate invitation program code module on the servers that is only used by those servers defined in the Test Servers Configuration illustrated in FIG. 6. Essentially, this gives the administrator the ability to test out new rules and rule changes without affecting live site users. The Customer clicks the publish test configuration button 180 and this will trigger the process of sending the selected and input data to the service provider and running the service provider's code generation engine. After the program code is generated the Customer is prompted to save the invitation program code module to a Customer's local hard drive. Once the code module has been generated and saved by the Customer locally, a Customer moves the generated invitation program code module to the test servers where a Customer can simulate browser users and view the invitation events, check tracking, generate tracking reports, etc.

FIG. 19 also illustrates the input objects which allow a Customer to replace all production configuration rules and invitations with those defined in the test configuration. This is useful in instance where a Customer may have modified the test rules and invitations, is satisfied with the updates and wants to put the changes into live production. The Customer clicks replace button 184 and all existing production configuration rules and invitations are deleted and replaced by the tested version residing on the test server. Note that FIGS. 18 and 19 illustrate display 172 and 182 respectively that allow Customers to view information regarding the last five publish events.

Figure 21:
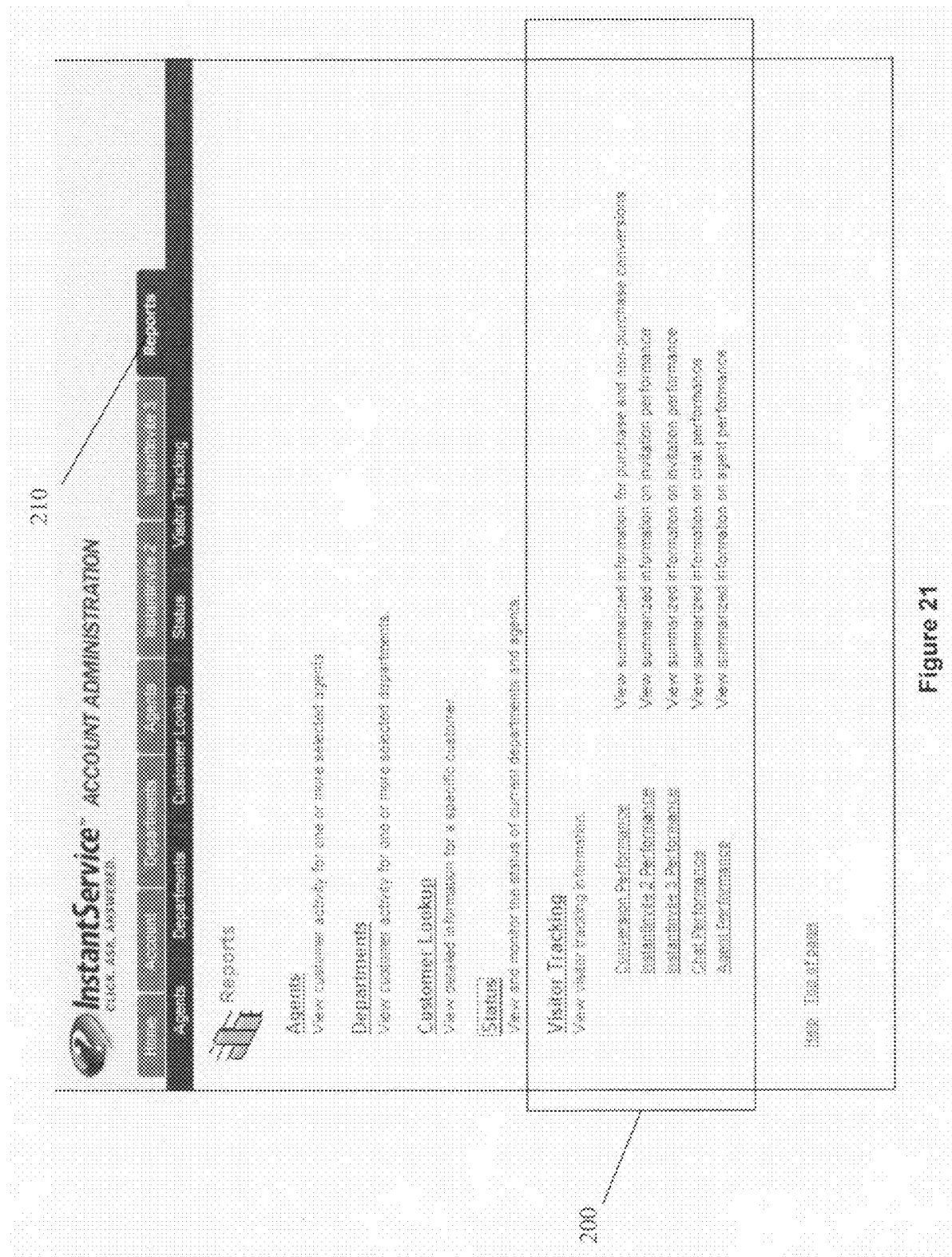
FIG. 21 is a screen shot for Customer interaction with one embodiment of the disclosed system and method.

Once the invitation program code module is running on the Customer web site and invitations are being generated, if the Customer has chosen to enable tracking, the invitation program code module can interface with third party analytics system tracking or the invitation program code module generates reports using the tracking data collected. FIG. 21 illustrates a method by which a Customer generates reports. The Customer clicks reports tab 210 to navigate to the page illustrated in FIG. 21. The Customer then clicks on any one of the report links contained in area 200 and the invitation program code module generate reports using the tracking data collected and displays it to the Customer in an interactive display.

Figure 22:
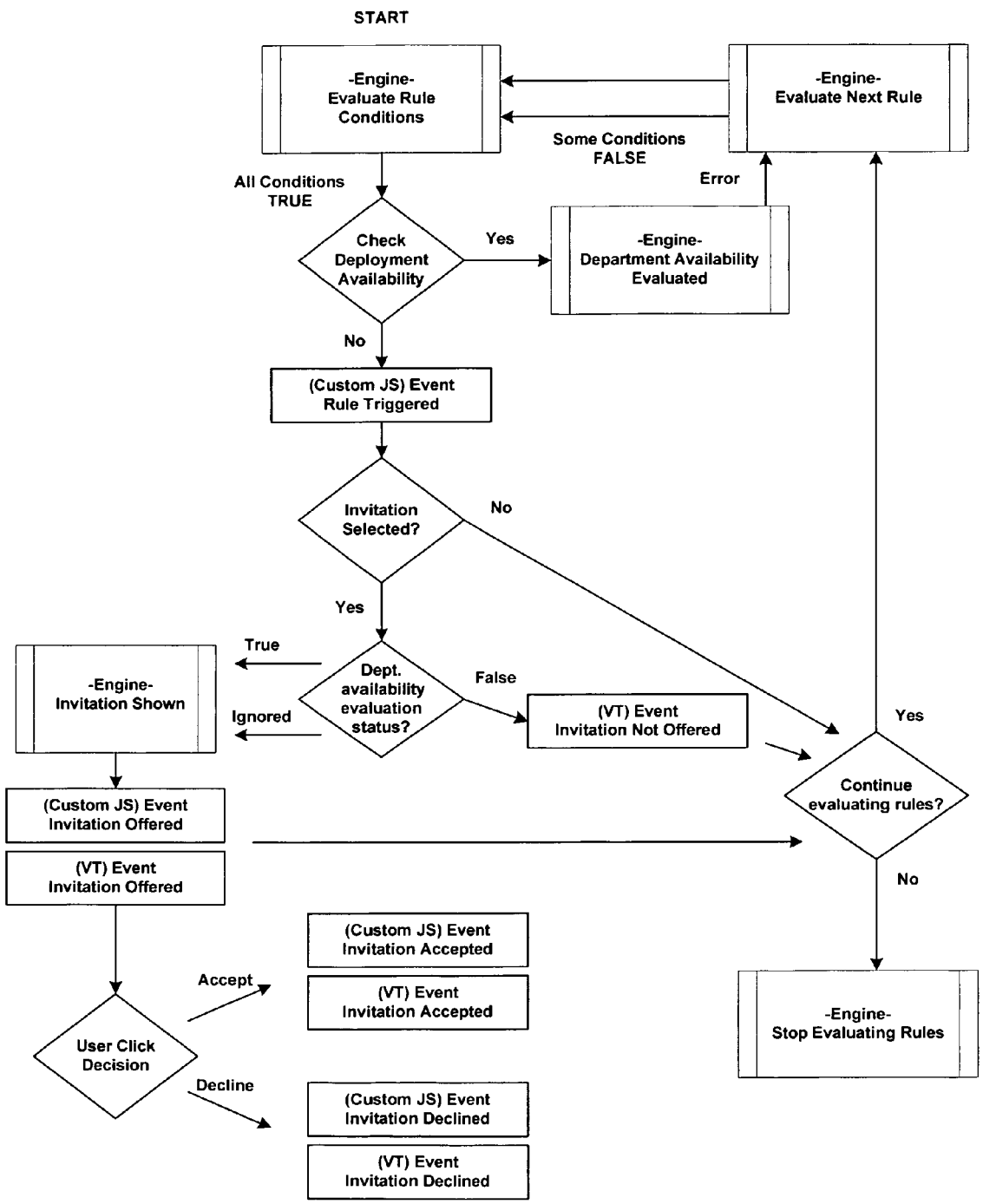
FIG. 22 is a flowchart of processes for one embodiment of the disclosed system and method.

FIG. 22 illustrates event tracking in general, and the interaction between various embodiments of invitation program code engines and the customized program code supplied by the service provider or the Customer to run interactively with visitor/invitation tracking events. The figure clarifies when a Customer designed code is triggered along with code imbedded within the invitation program code module's visitor tracking functions and when they are triggered independently. When an invitation is not offered it does not necessarily mean that the invitation was not offered because the department was unavailable. It is dependent upon how the department availability check is configured for the rule. For example, for some Customers, if the department availability check is configured to display an invitation if the department is closed, the Rule Fired Invitation Offered event is tracked when the invitation is displayed. However, in some systems, events will not be sent if an invitation is not associated with the rule. The diagram in FIG. 22 illustrates when both the Visitor Tracking (VT Event) and Custom JavaScript events (JS Event) will be fired.

INDUSTRIAL APPLICABILITY

A major benefit of using Customer hosted rule based invitations is the increased ability to better identify and qualify browsing users that are more likely to purchase a product or a service. Another benefit is in user retention and/or the ability to prevent disillusioned users from abandoning a purchase because of an issue that comes up during the purchase process.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A computer implemented method for creating a custom chat invitation for a web site executed on a web site server, the method comprising:
   providing at a first server a set of input objects to a user associated with the web site to allow the user to create a customized set of invitation setup data, the set of input objects generating responsive input provided by the user, the customized set of invitation setup data based on the responsive input;
   generating at the first server an invitation program code module based on the received customized set of invitation setup data, the invitation setup data comprising conditions and rules that define how a user's browsing behavior, while interacting with the web site, will dynamically generate the chat invitation on the web site while the web site is displayed on a client computer, the dynamic generation comprising dynamically inserting a link on the web site in response to the browsing behavior; and
   transmitting the invitation program code module to the web site server, wherein the web site server is a different server than the first server, and the web site server hosts the web site comprising web pages that is displayed on the client computer;
   wherein the invitation program code module is adapted to be integrated with the web site and generates the custom chat invitation on the web site including the conditions and rules, before a chat is initiated by an end user at the client computer, and the invitation program code module is hosted by the web site server and is interactively connected to the code that generates the web pages.

2. The method of claim 1, wherein the providing at the first server comprises providing a plurality of input forms for interaction with the user.

3. The method of claim 1, wherein the invitation setup data comprises a selection of the types of tracking data that will be collected in conjunction with the chat invitation, wherein the invitation program code module generates the tracking data in response to user interactions with custom chat invitations generated on the web site.

4. The method of claim 1, wherein the invitation setup data comprises how the chat invitation will be programmatically generated.

5. The method of claim 1, wherein the custom chat invitation comprises an offer of a printable coupon for an item being viewed.

6. The method of claim 1 further comprising:
   collecting and storing web page browsing data for a browsing user on a data storage medium;
   programmatically evaluating the browsing user web page browsing data according to the set of invitation criteria within the invitation program code module; and
   triggering an invitation event when the evaluated browsing user data meets a selected subset of the set of invitation criteria of the invitation program code module.

7. The method of claim 6 further comprising:
   storing invitation event tracking data on the data storage medium; and
   reporting the invitation event tracking data to the user.

8. A system for creating a custom chat invitation for a web site having executed on a web site server, comprising:
   a processor;
   a computer readable medium coupled to the processor that includes instructions that cause the processor to implement the functionality of:
   providing at a first server a set of input objects to a user associated with the web site to allow the user to create a customized set of invitation setup data, the set of input objects generating responsive input provided by the user, the customized set of invitation setup data based on the responsive input;
   generating at the first server an invitation program code module based on the received customized set of invitation setup data, the invitation setup data comprising conditions and rules that define how a user's browsing behavior, while interacting with the web site, will dynamically generate the chat invitation on the web site while the web site is displayed on a client computer, the dynamic generation comprising dynamically inserting a link on the web site in response to the browsing behavior; and
   transmitting the invitation program code module to the web site server, wherein the web site server is a different server than the first server, and the web site server hosts the web site comprising web pages that is displayed on the client computer;
   wherein the invitation program code module is adapted to be integrated with the web site and generates the custom chat invitation on the web site including the conditions and rules, before a chat is initiated by an end user at the client computer, and the invitation program code module is hosted by the web site server and is interactively connected to the code that generates the web pages.

9. The system of claim 8, wherein the providing at the first server comprises providing a plurality of input forms for interaction with the user.

10. A system of claim 8, wherein the invitation setup data comprises a selection of the types of tracking data that will be collected in conjunction with the chat invitation, wherein the invitation program code module generates the tracking data in response to user interactions with custom chat invitations generated on the web site.

11. A non-transitory computer readable medium having instructions stored thereon that, when executed by a processor, causes the processor to create a custom chat invitation for a web site and executed on a web site server, the creating comprising:

provides at a first server a set of input objects to a user associated with the web site to allow the user to create a customized set of invitation setup data, the set of input objects generating responsive input provided by the user, the customized set of invitation setup data based on the responsive input;

generating at the first server an invitation program code module based on the received customized set of invitation setup data, the invitation setup data comprising conditions and rules that define how a user's browsing behavior, while interacting with the web site, will dynamically generate the chat invitation on the web site while the web site is displayed on a client computer, the dynamic generation comprising dynamically inserting a link on the web site in response to the browsing behavior; and transmitting the invitation program code module to the web site server, wherein the web site server is a different server than the first server, and the web site server hosts the web site comprising web pages that is displayed on the client computer;

wherein the invitation program code module is adapted to be integrated with the web site including the conditions and rules to generate the custom chat invitation on the web site, before a chat is initiated by an end user at the client computer, and the invitation program code module is hosted by the web site server and is interactively connected to the code that generates the web pages.

12. The computer readable medium of claim 11 wherein the invitation setup data comprises conditions and rules that will trigger the chat invitation.

13. The computer readable medium of claim 11 wherein the invitation setup data comprises a selection of the types of tracking data that will be collected in conjunction with the chat invitation, wherein the invitation program code module generates the tracking data in response to user interactions with custom chat invitations generated on the web site.

14. The computer readable medium of claim 11, wherein the custom chat invitation comprises an offer of a printable coupon for an item being viewed.

15. The computer readable medium of claim 11, further comprising:

collecting and storing web page browsing data on data storage medium;

evaluating the web page browsing data according to the set of invitation criteria within the invitation program code module; and triggering an invitation event when a selected subset of the invitation criteria are met.

16. The computer readable medium of claim 15 further comprising:

storing tracking data for an invitation event on data storage medium; and reporting the invitation event tracking data to the user.

* * * * *